(12) United States Patent
Grover

(10) Patent No.: US 7,347,555 B2
(45) Date of Patent: Mar. 25, 2008

(54) MULTI-DIMENSIONAL IMAGING APPARATUS, SYSTEMS, AND METHODS

(75) Inventor: Trent Grover, Ames, IA (US)

(73) Assignee: Micoy Corporation, Des Moines, IA (US)

( * ) Notice: Subject to any disclaimer, the term of this patent is extended or adjusted under 35 U.S.C. 154(b) by 157 days.

(21) Appl. No.: 11/020,787

(22) Filed: Dec. 22, 2004

(65) Prior Publication Data

US 2005/0141089 A1 Jun. 30, 2005

(51) Int. Cl.
*G03B 21/14* (2006.01)
(52) U.S. Cl. ......................................... 353/7; 359/466
(58) Field of Classification Search ................... 353/7, 353/8, 9, 10, 94; 396/324, 462, 376; 352/43, 352/57, 129, 59; 348/42, 49, 51; 359/23, 359/462, 376, 377, 378, 466, 458, 473
See application file for complete search history.

(56) References Cited

U.S. PATENT DOCUMENTS

| | | | |
|---|---|---|---|
| 3,953,869 A | 4/1976 | Wah Lo et al. | |
| 4,063,265 A | 12/1977 | Lo et al. | |
| 4,475,798 A | 10/1984 | Smith et al. | |
| 4,868,682 A * | 9/1989 | Shimizu et al. | 386/96 |
| 4,927,262 A * | 5/1990 | Schwartz | 353/13 |
| 5,023,725 A | 6/1991 | McCutchen | |
| 5,130,794 A | 7/1992 | Ritchey | |
| 5,562,572 A | 10/1996 | Carmein | |
| 5,650,813 A | 7/1997 | Gilblom et al. | |
| 5,657,073 A | 8/1997 | Henley | |
| 5,668,595 A | 9/1997 | Katayama et al. | |
| 5,721,585 A | 2/1998 | Keast et al. | |
| 5,905,593 A * | 5/1999 | Lo et al. | 359/463 |
| 5,946,077 A | 8/1999 | Nemirovskiy | |
| 5,973,726 A | 10/1999 | Iijima et al. | |
| 5,980,256 A | 11/1999 | Carmein | |
| 6,023,588 A | 2/2000 | Ray et al. | |
| 6,031,540 A | 2/2000 | Golin et al. | |
| 6,034,716 A | 3/2000 | Whiting et al. | |

(Continued)

FOREIGN PATENT DOCUMENTS

DE 10030196 A1 1/2002

(Continued)

OTHER PUBLICATIONS

Chen, Y. P., "Landscape Generation: A Changing Prospective", *ESD: The Electronic System Design Magazine*, v18, (Feb. 1988),44.

(Continued)

*Primary Examiner*—William C. Dowling
(74) *Attorney, Agent, or Firm*—Charles A. Lemaire; Lemaire Patent Law Firm, P.L.L.C.

(57) ABSTRACT

A lens, an apparatus, and a system, as well as a method and article, may operate to receive a plurality of left eye rays through a first plurality of separating facets of a lens at an image acquisition plane, and to receive a plurality of right eye rays through a second plurality of separating facets of the lens at the image acquisition plane. Data acquired from the image plane may be used to construct a stereoscopic image, including a moving, panoramic stereoscopic image. Lenses, image capture devices, and projectors may be implemented that operate using three or more viewpoints.

34 Claims, 18 Drawing Sheets

U.S. PATENT DOCUMENTS

| | | |
|---|---|---|
| 6,075,905 A | 6/2000 | Herman et al. |
| 6,112,033 A | 8/2000 | Yano et al. |
| 6,141,034 A | 10/2000 | McCutchen |
| 6,169,858 B1 | 1/2001 | Ray |
| 6,236,748 B1 | 5/2001 | Iijima et al. |
| 6,243,103 B1 | 6/2001 | Takiguchi et al. |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,469,710 B1 | 10/2002 | Shum et al. |
| 6,522,325 B1 | 2/2003 | Sorokin et al. |
| 6,559,846 B1 | 5/2003 | Uyttendaele et al. |
| 6,639,596 B1 | 10/2003 | Shum et al. |
| 6,654,019 B2 | 11/2003 | Gilbert et al. |
| 6,665,003 B1 | 12/2003 | Peleg et al. |
| 6,683,608 B2 | 1/2004 | Golin et al. |
| 6,755,532 B1 * | 6/2004 | Cobb ............................ 353/7 |
| 6,947,059 B2 | 9/2005 | Pierce et al. |
| 6,999,071 B2 * | 2/2006 | Balogh ........................ 345/419 |
| 7,150,531 B2 * | 12/2006 | Toeppen ........................ 353/7 |
| 2003/0234909 A1 * | 12/2003 | Collender et al. ............. 353/7 |
| 2004/0001138 A1 * | 1/2004 | Weerashinghe et al. ...... 348/36 |

FOREIGN PATENT DOCUMENTS

| | | |
|---|---|---|
| JP | 07-140569 A | 6/1995 |
| WO | WO-9917543 | 4/1999 |
| WO | WO-0244808 A2 | 6/2002 |
| WO | WO-2005067318 A3 | 7/2005 |

OTHER PUBLICATIONS

Pritch, Y., et al., "Automatic Disparity Control in Stereo Panoramas (OmniStereo)", *Omnidirectional Vision, Proceedings.*, IEEE Workshop on Jun. 12, 2000.

"Globuscope Panoramic Camera (advertisement)", Obtained on Mar. 30, 2000 from http://www.everent.com/globus/, 2 pgs.

"Live Picture Reality Studio", Obtained on Mar. 27, 2000 from http://www.livepicture.com/products/studio/content/html, 1 pg.

Charles, Jeffrey R., "Polar Projection and X-Y Omnidirectional Images", Obtained Mar. 30, 2000, from http://www.versacorp.com/vlink/product/polxyimg.html/, 3 pgs.

Charles, Jeffrey R., "Portable All-Sky Reflector with "Invisible" Axial Camera Support (U.S. Patent No. D312,263)", Obtained from http://www.versacorp.com/versalink_fld/jcarticle_fld/allsky.htm, Presented at the 1987 Riverside Telescope Makers Conference, and published in the 1988 RTMC Proceedings; last updated Dec. 11, 1997,(1987),12 pgs.

Slater, Dan, "A full sphere camera for point of view and VR photography", Obtained from http://www.nearfield.com/SPHERECA/spherecam.htm, 11 pgs, no date.

* cited by examiner

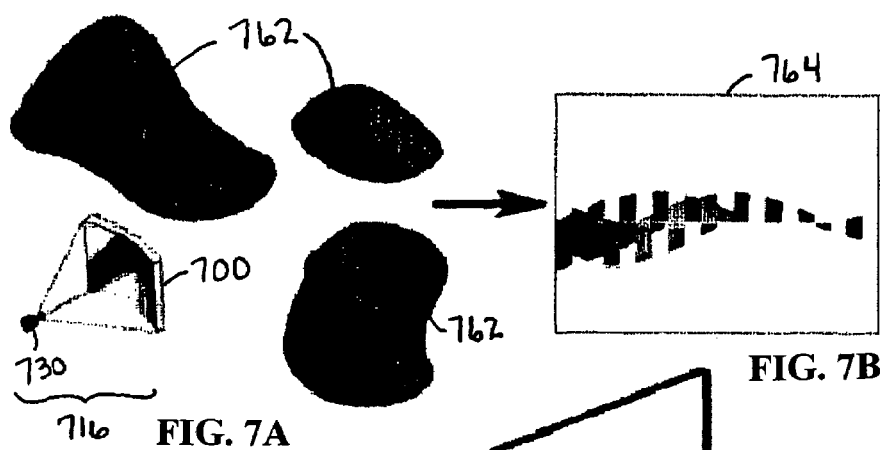
FIG. 7A
FIG. 7B
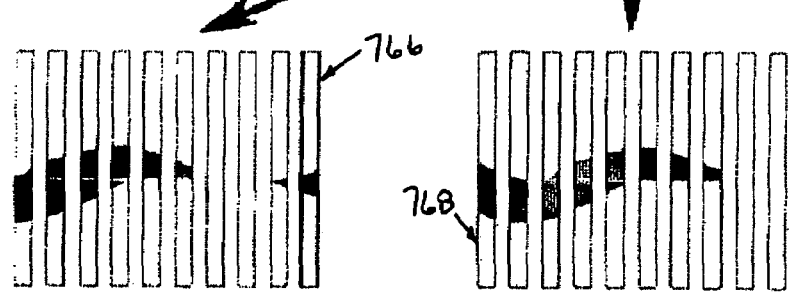
FIG. 7C
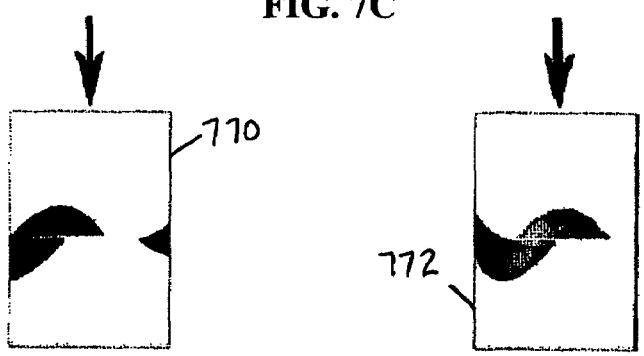
FIG. 7D
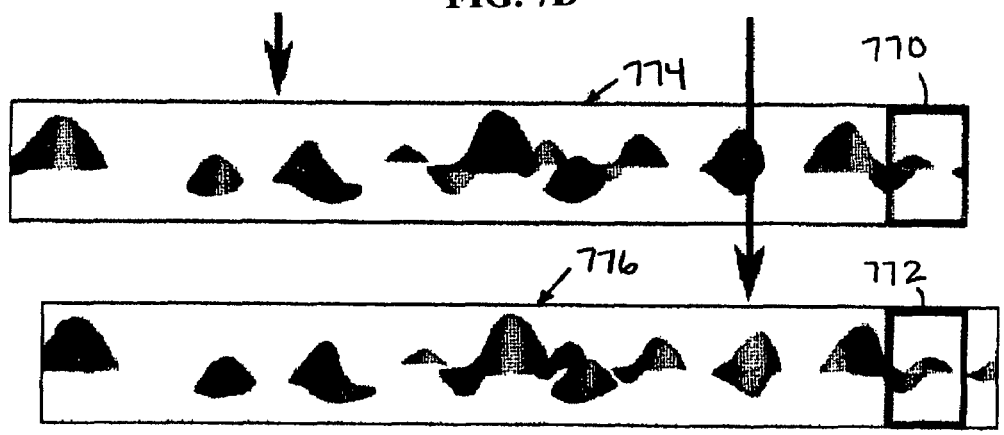
FIG. 7E

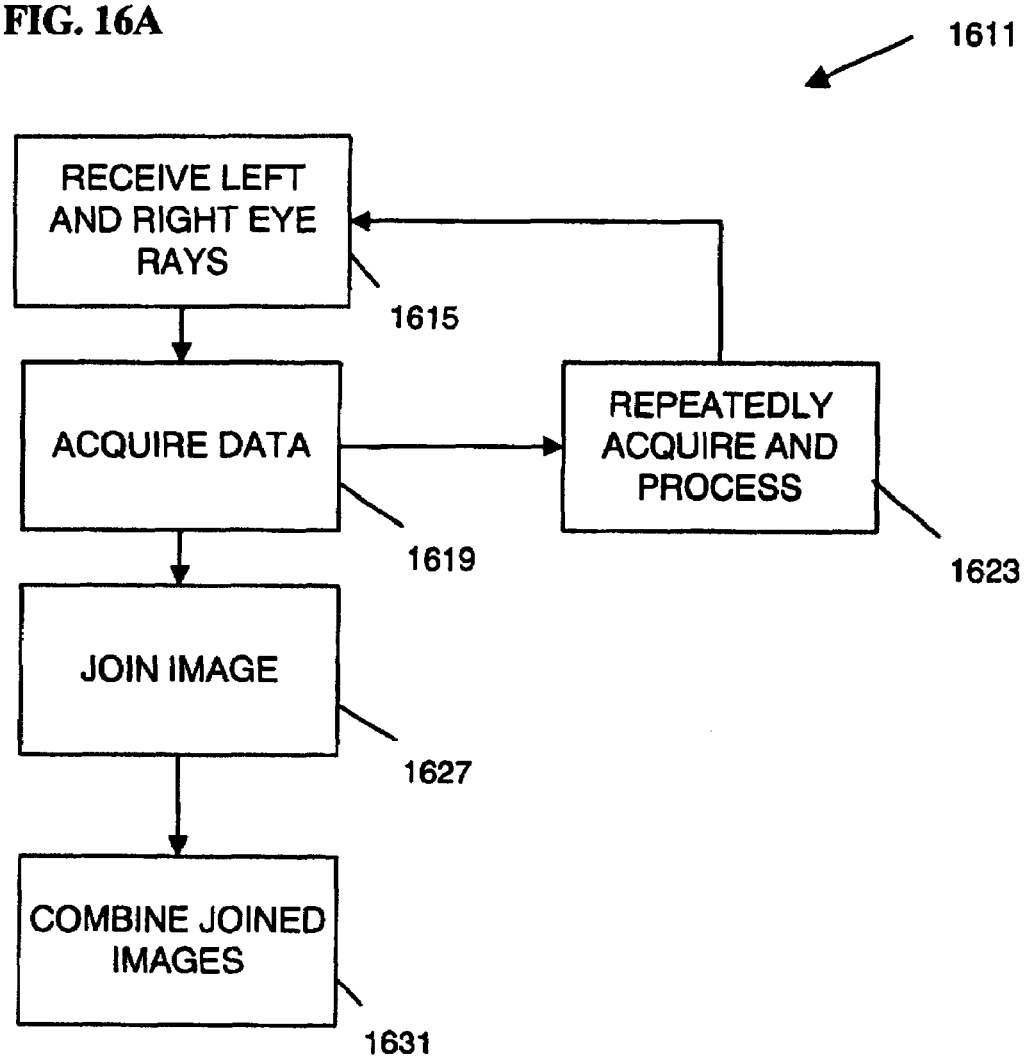

MULTI-DIMENSIONAL IMAGING APPARATUS, SYSTEMS, AND METHODS

TECHNICAL FIELD

Various embodiments described herein relate generally to image processing, including apparatus, systems, and methods used to record and project multi-dimensional images.

BACKGROUND INFORMATION

Cylindrical panoramas may be constructed using a single rotating camera. As the camera is rotated, images may be captured at defined increments until the desired panoramic field of view has been traversed. Vertical strips may then be extracted from the center of each image, and the strips can be placed next to one another to form a single uninterrupted cylindrical panoramic image.

This process can be extended to create cylindrical stereoscopic (e.g., three-dimensional) panoramic images. For example, two cameras can be mounted, one next to the other, separated by a defined distance. The cameras may then be rotated in unison about a point halfway between them. Each camera can be used to create a separate cylindrical panorama using concatenated vertical image slices, as described above. When the two resulting panoramas are viewed together, one by an observer's left eye and the other by the observer's right eye, a stereoscopic effect is achieved. However, while the rotating two-camera model may be useful for creating still stereoscopic images, the system described does not lend itself to efficiently providing a moving stereoscopic panoramic image.

BRIEF DESCRIPTION OF THE DRAWINGS

FIGS. 7A-E illustrate portions of a stereoscopic panorama creation process according to various embodiments;

FIGS. 16A and 16B are flow charts illustrating several methods according to various embodiments.

DETAILED DESCRIPTION

Figure 1:
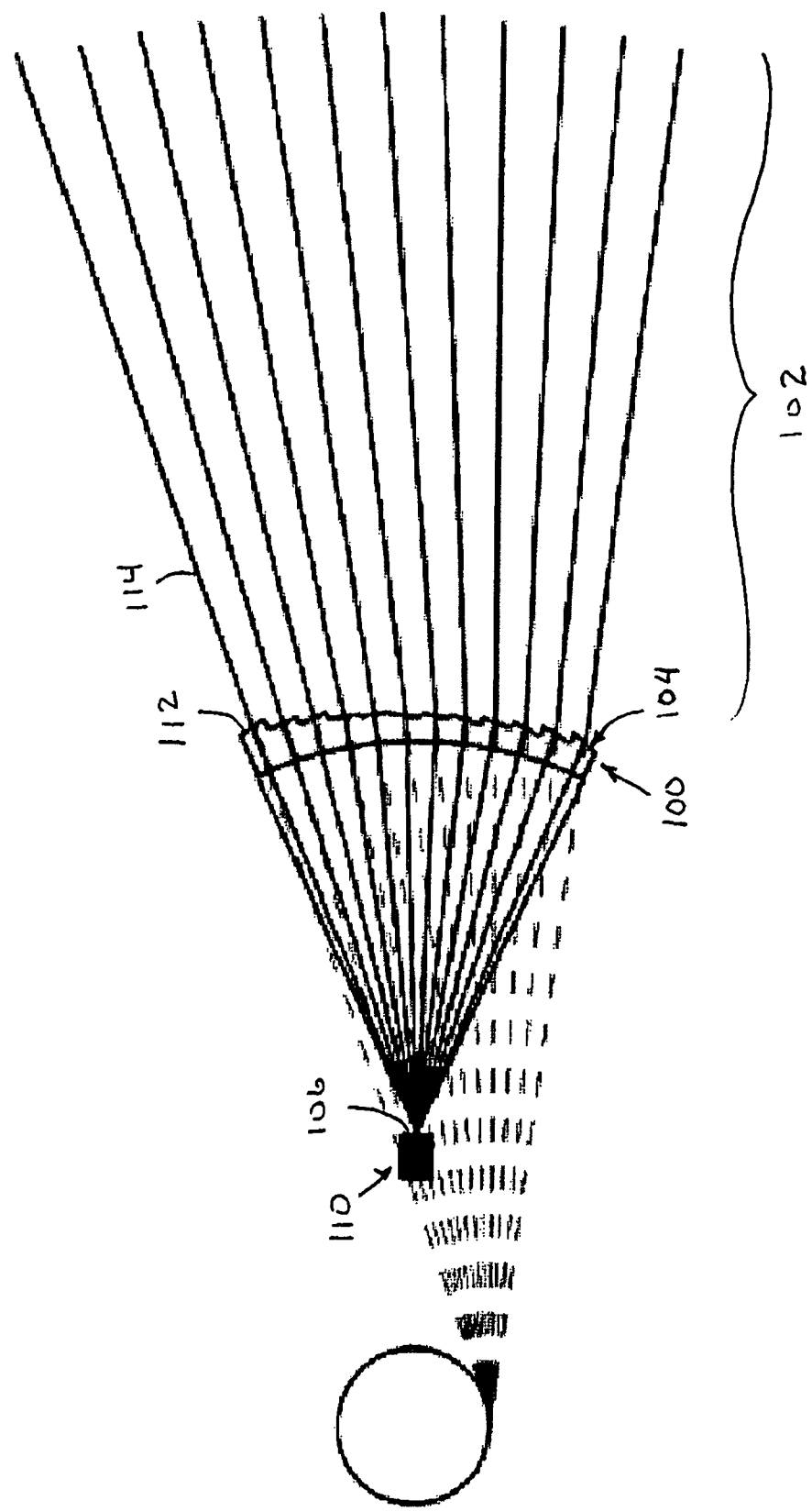
FIG. 1 is a top view of a lens refracting right eye rays according to various embodiments.

It should be noted that the quality of the stereoscopic effect created using two cameras may be governed by the distance separating the centers of the camera lenses. When the lenses are separated by an amount approximating the average human inter-ocular distance (i.e., about 6.4 centimeters, or the average distance between the pupils of the left and right eyes), the stereoscopic effect may accurately mimic human vision. If the cameras are placed closer together, the three dimensional depth of the captured scene may diminish. If they are placed farther apart, the three dimensional depth may increase. Thus, many stereoscopic camera systems use a camera or lens separation of about 6.4 centimeters.

As a part of creating the components of a new apparatus and system for stereoscopic imaging, one may consider the previously-described, rotating two-camera model, abstracting a small vertical image strip from each panorama to a single ray, terminating at the center of each camera's image acquisition plane. When two cameras are rotated about a common center point, these rays rotate along a path that is tangential to a circle having a diameter equivalent to the distance separating the two cameras. As noted previously, the diameter of the central circular path may govern the perceived inter-ocular distance of the resulting cylindrical stereoscopic panorama. In order to design a camera system capable of capturing a moving cylindrical stereoscopic image (e.g., video) in real time, it may be convenient to construct an apparatus to capture all of these rays at substantially the same time. However, since it is not convenient to arrange several cameras around a 6.4 cm diameter circle, a mechanism that allows a video camera (or other image capture device) of arbitrary size to capture alternating left and right eye rays from outside of the center inter-ocular circle may be needed.

To simplify the resulting apparatus, the cylindrical field of view may be divided into smaller pieces, each covered by an individual image capture device. To capture the left eye rays and right eye rays for each device, a lens and an apparatus may be constructed to interlace them. Conceptually, this interlacing is a simple horizontal alternation of left eye rays and right eye rays. This effect can be achieved using a lens specifically designed to refract left and right eye rays in an unusual way., This lens may be designed to encompass the entire surface area of a cylinder surrounding a multi-camera assembly. However, the radial symmetry of a multi-camera assembly helps simplify the lens design process. Instead of using a single unified cylindrical lens to refract the incoming light rays, the cylindrical surface can be separated into several identical portions, or segments. The area of the cylindrical surface corresponding to a single video camera can thus be isolated, and the isolated lens segment can be designed in relation to its corresponding video camera. The resulting combination of a lens segment and video camera can then be replicated to comprise the remaining area of the cylindrical image acquisition assembly.

Thus, each lens or lens segment may be designed to refract various incoming light rays, corresponding to the left and right eye viewing rays, into its respective video camera. Since the left and right eye rays pass through the cylindrical lens surface in a non-symmetrical way, a uniform lens surface may not properly accomplish such refraction.

Figure 2:
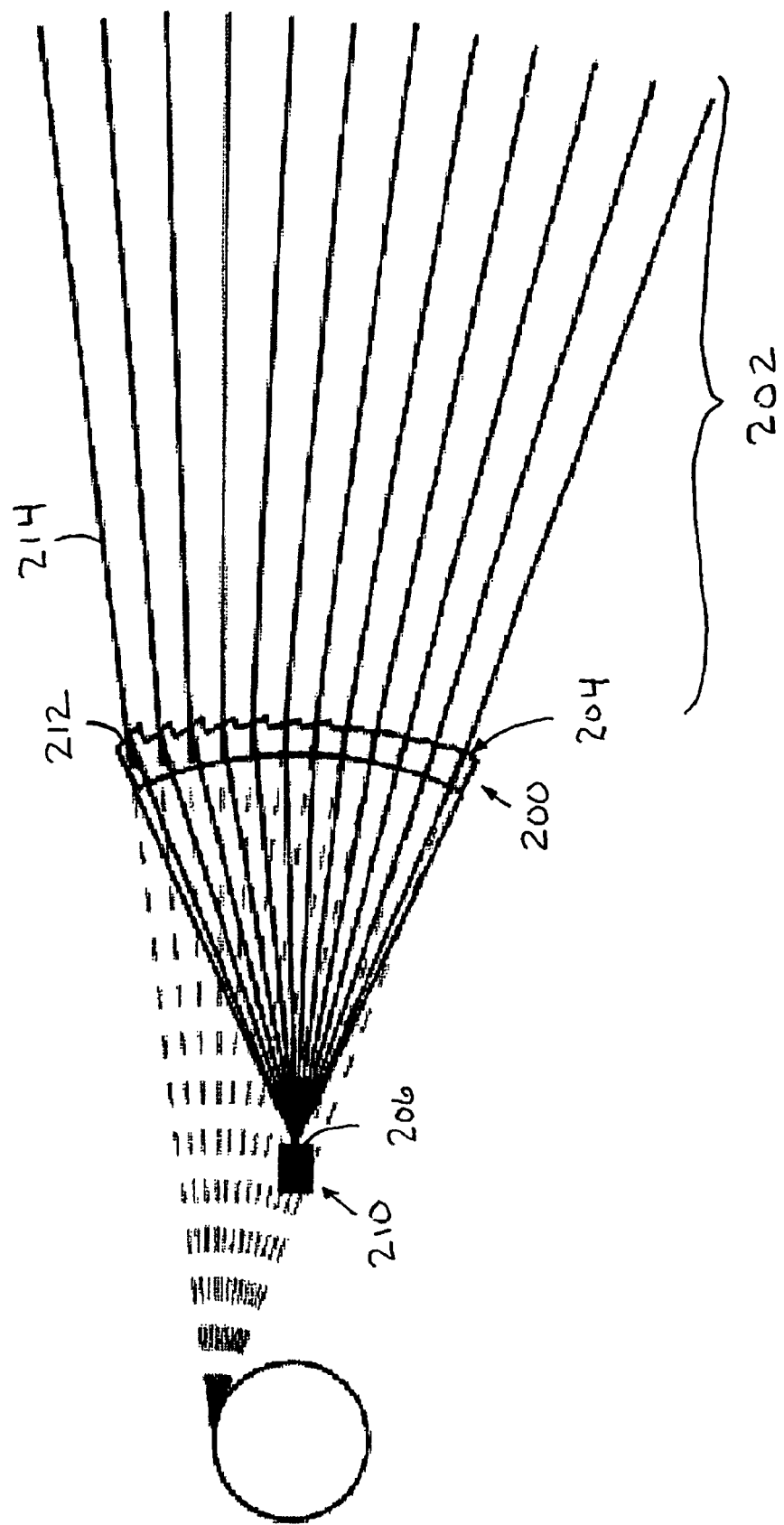
FIG. 2 is a top view of a lens refracting left eye rays according to various embodiments.

FIG. 1 is a top view of a lens 100 refracting right eye rays 102 according to various embodiments, and FIG. 2 is a top view of a lens 200 refracting left eye rays 202 according to various embodiments. It can be seen that a faceted lens 100, 200 has an outer surface 104, 204 (i.e., the faceted surface) designed to refract right eye rays 102 and left eye rays 202 onto the image acquisition plane 106, 206 of a video camera 110, 210, or other image capture device. Using the faceted lens surface 104, 204, individual vertical lens facets 112, 212 are used to refract individual vertical spans of eye rays 114, 214 into individual vertical lines of pixels included in the video camera's 110, 210 captured image acquisition plane 106, 206.

Figure 3:
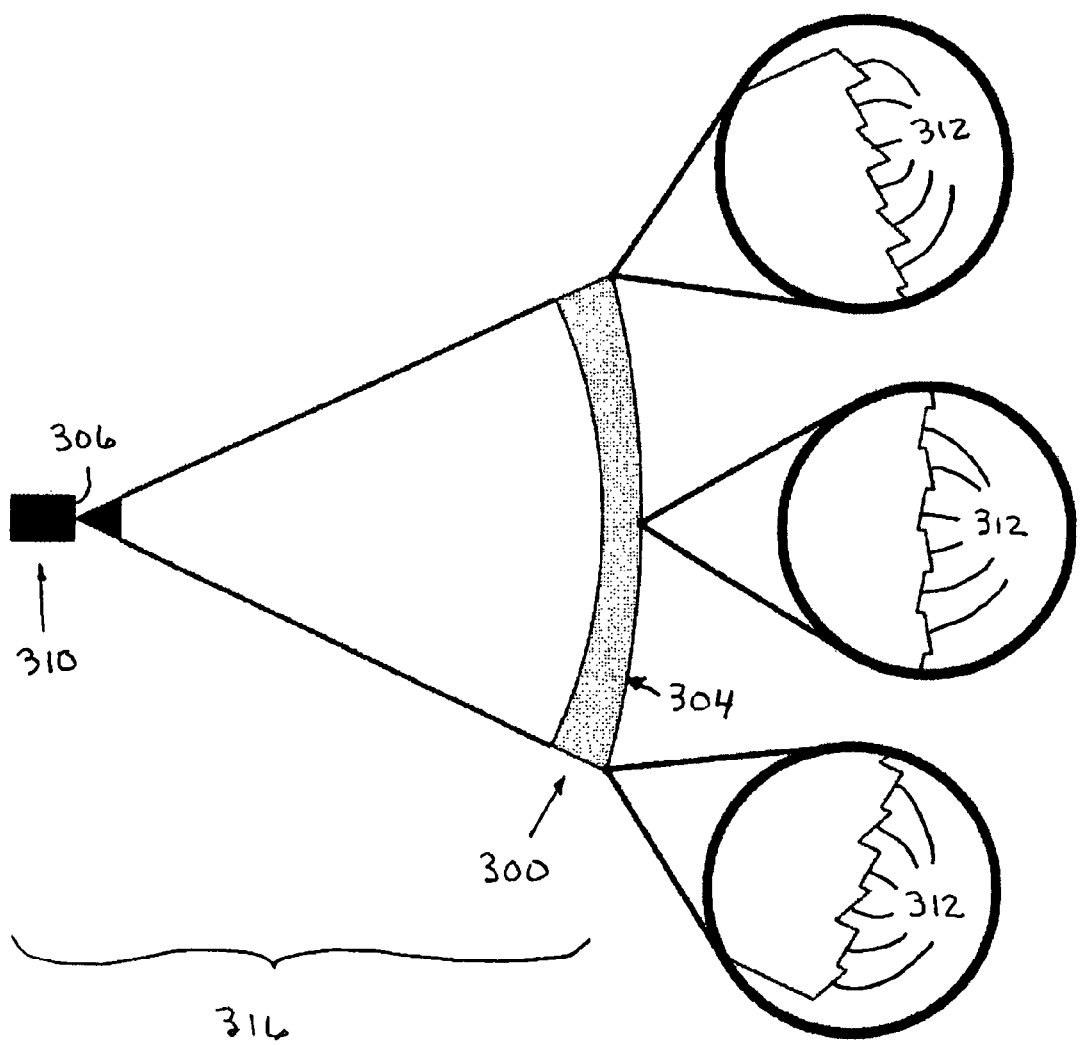
FIG. 3 is a top view of a lens and apparatus according to various embodiments.

FIG. 3 is a top view of a lens 300 and apparatus 316 according to various embodiments of the invention. In this case, the individual lens facets 312 for left and right eye rays are alternated along the outer surface 304 of the lens 300 in order to capture both left eye rays and right eye rays at substantially the same time. The rays can be refracted onto the image acquisition plane 306 of the video camera 310, or other image capture device.

The use of an interlaced, faceted lens 300 allows the video camera 310 (or other image capture device) to capture a sequence of vertically interlaced images. Since this vertical interlacing pattern remains constant throughout the entire video sequence, the left and right eye imagery can be isolated and separated in real time. The uniformly radial, tangential nature of the captured left and right eye rays allows several of these lens-camera apparatus to be placed next to one another to extend the cylindrical field of view of the overall device. Thus, it is the combination apparatus 316, comprising the lens 300 and the video camera 310, or other image capture device, that may be replicated a number of times to provide a panoramic, stereoscopic image capture system. For the purposes of this document, the term "panoramic" means an image, either monoscopic or stereoscopic, having a field of view of from about 60 degrees up to about 360 degrees.

Figure 4:
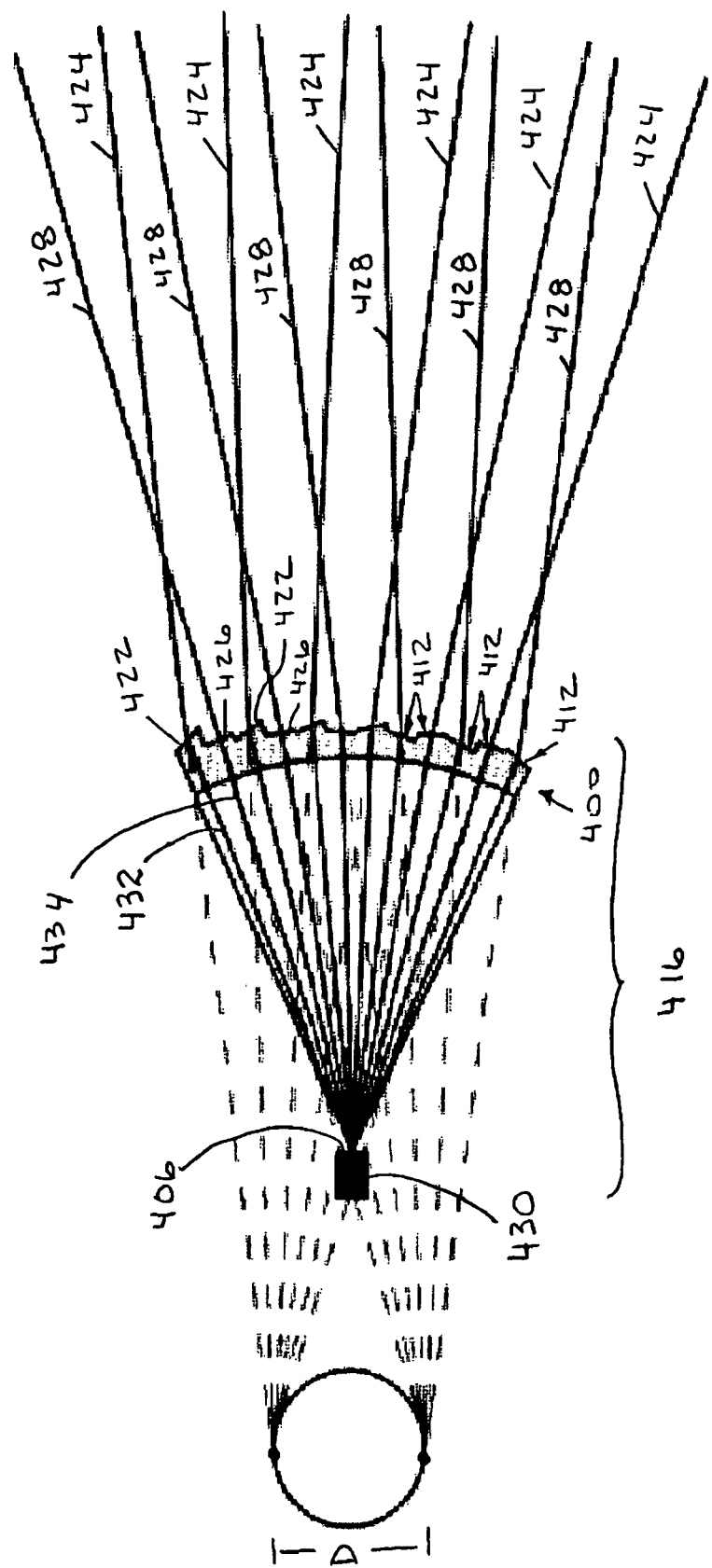
FIG. 4 is a top view of an apparatus according to various embodiments.

FIG. 4 is a top view of an apparatus 416 according to various embodiments. In this illustration, the apparatus 416, which may be similar to or identical to the apparatus 316 is shown, along with the relevant inter-ocular distance D. The apparatus 416 may include a lens 400 having a plurality of interleaved separating facets 412 including a first separating facet 422 to refract left eye rays 424 and a second separating facet 426 to refract right eye rays 428. The apparatus 416 may also include an image acquisition plane 406 (perhaps as part of an image capture device 430, such as a framegrabber, digital video camera, or some other device) to receive a refracted left eye ray 432 from the first separating facet 422, and to receive a refracted right eye ray 434 from the second separating facet 426.

Figure 5:
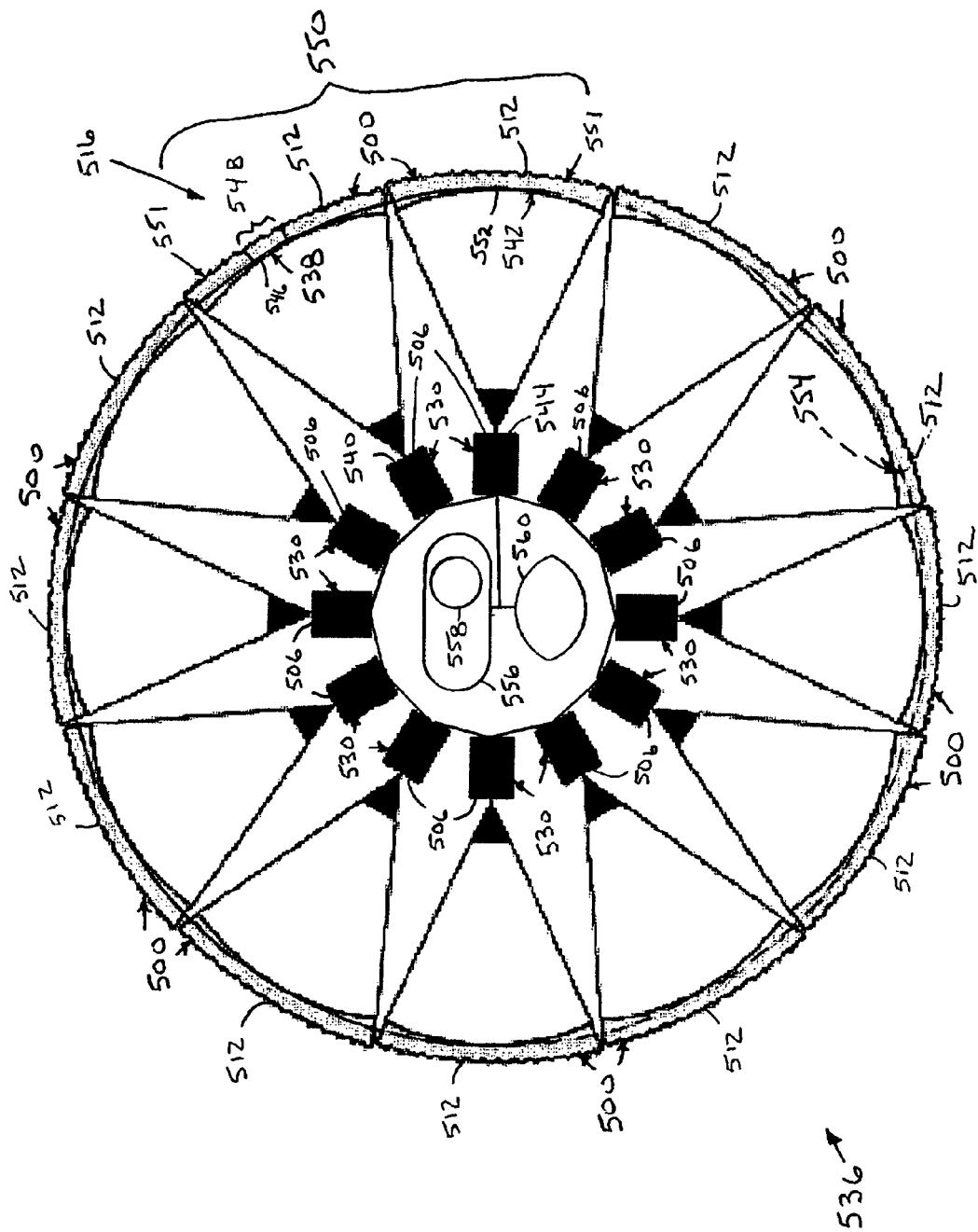
FIG. 5 is a top view of an apparatus and a system according to various embodiments.

FIG. 5 is a top view of an apparatus 516 and a system 536 according to various embodiments. The apparatus 516 may include a first lens 538 and a first image acquisition plane 540 as shown in FIG. 4 with respect to apparatus 416. The apparatus 516 may also include a second lens 542 and image acquisition plane 544. The first lens 538 and first image acquisition plane 540 may be similar to or identical to the lens 400 and image acquisition plane 406 shown in FIG. 4. The second lens 542 and second image acquisition plane 544 may also be similar to or identical to the lens 400 and image acquisition plane 406 shown in FIG. 4, such that the second lens 542 may have a second plurality of interleaved separating facets (not shown in FIG. 5) including a third separating facet to refract left eye rays and a fourth separating facet to refract right eye rays. The second image acquisition plane 544 may be used to receive a second refracted left eye ray from the third separating facet, and to receive a second refracted right eye ray from the fourth separating facet, as described with respect to the apparatus 416 depicted in FIG. 4.

The first lens 538 may have a first inner radius 546 defining a portion 548 of a cylindrical section 550, and the second lens 542 may have a second inner radius 552 located approximately on a cylinder 554 defined by the portion 548 of the cylindrical section 550. Thus, the lenses 400, 500 may include an inner radius 546 defining a portion 548 of a cylindrical section 550, as well as an outer radius 551 along which are approximately located a plurality of separating facets 512. The plurality of facets 512 may include a plurality of left eye ray separating facets interleaved with a plurality of right eye ray separating facets (see FIG. 4, elements 412, 422, and 426). Ultimately, an entire 360-degree cylindrical field of view can be achieved.

Figure 6:
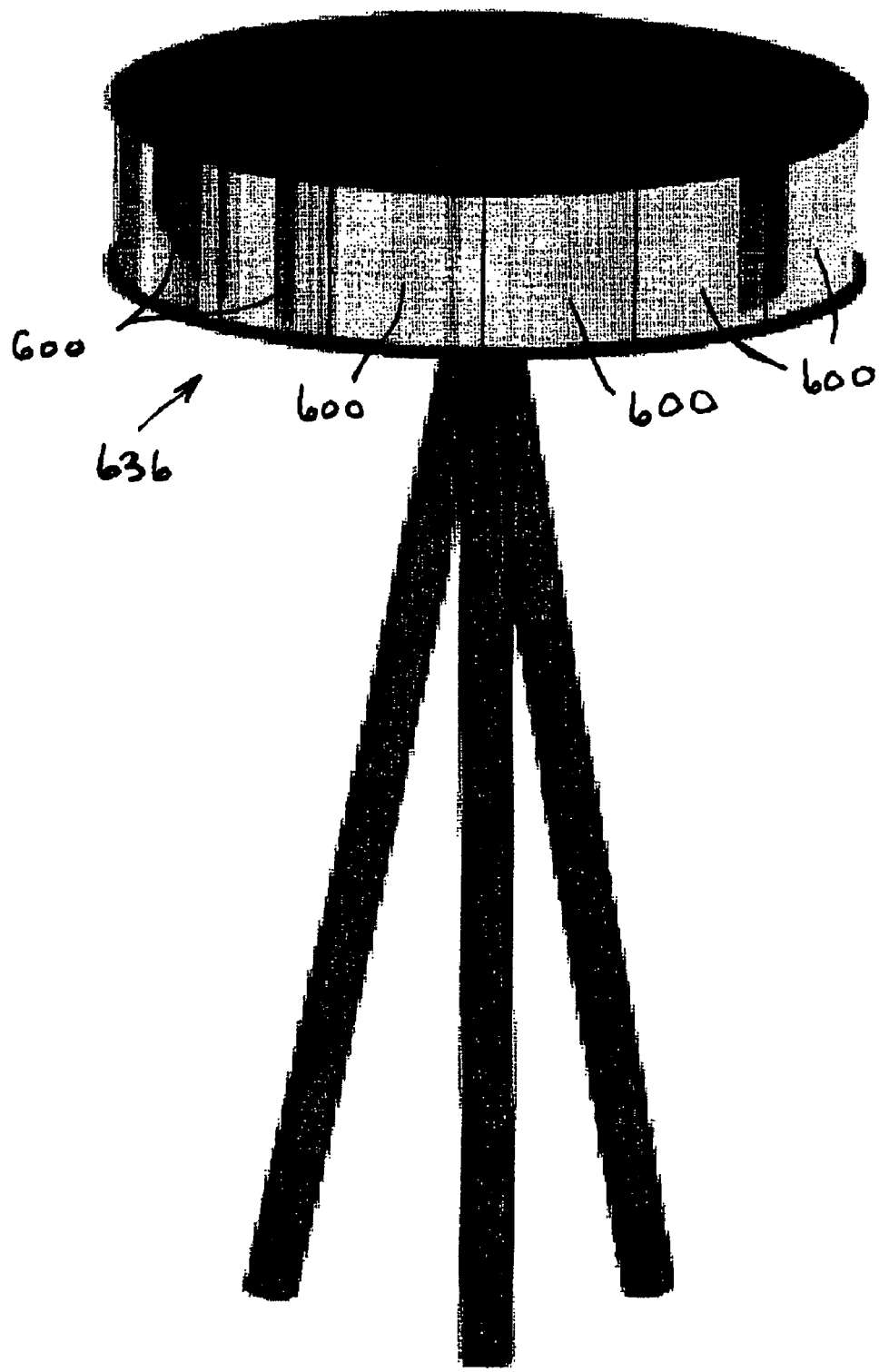
FIG. 6 is a perspective view of a system according to various embodiments.

FIG. 6 is a perspective view of a system 636 according to various embodiments. Referring now to FIGS. 5 and 6, it can be seen that a system 536, 636 may include a plurality of lenses 500, 600. The lenses 500, 600 may be similar to or identical to the lens 400 shown in FIG. 4, having a plurality of interleaved facets 412, 512. The system 536, 636 may also include a plurality of image acquisition planes 506 (not shown in FIG. 6) to receive refracted left eye rays from first separating facets in the lenses 500, 600, and to receive refracted right eye rays from second separating facets in the lenses 500, 600. The system 536, 636 may include a memory 556 (not shown in FIG. 6) to receive image data 558 (not shown in FIG. 6) from the plurality of image acquisition planes 506.

The image data 558 may include information to construct a stereoscopic image, including a panoramic stereoscopic image. The image data 558 may include a separated left eye image and a separated right eye image. The system 536, 636 may also include a processor 560 coupled to the memory 556 to join the separated left eye image and the separated right eye image (e.g. see elements 770, 772 of FIG. 7). As noted previously, when several apparatus 416 (see FIG. 4) are placed next to each other, in a manner similar to or identical to that shown in FIG. 5 with respect to apparatus 516, the resulting extracted left and right eye imagery can also be placed next to each other in real time to create uniform, seamless left and right eye panoramic imagery (see elements 774, 776 of FIG. 7). This process will now be examined in more detail.

FIGS. 7A-7E illustrate portions of a stereoscopic panorama creation process according to various embodiments. This process permits real-time capture of 360-degree, cylindrical stereoscopic video imagery. In FIG. 7A, a single apparatus 716, including a lens 700 (similar to or identical to the lens 400 shown in FIG. 4) and an image capture device 730 (similar to or identical to the image capture device 430 of FIG. 4), is shown being used to capture an image of various objects 762. FIG. 7B depicts an approximation of an interlaced image 764 captured by the image capture device 730 via the faceted lens 700 (e.g., constructed from a plurality of captured left eye rays and a plurality of captured right eye rays). FIG. 7C shows de-interlaced left and right eye image strips 766, 768 constructed from the interlaced image 764. FIG. 7D shows concatenated left and right image sections 770, 772, or separated left and right eye images, constructed from the de-interlaced left and right eye image strips 766, 768, respectively. Finally, FIG. 7E shows left and right eye panoramic images 774, 776, respectively, obtained by joining together a number of left and right image sections obtained from adjoining apparatus 716, including left and right image sections 770, 772, arranged in a manner similar to or identical to that of the apparatus 516 in FIG. 5. When the left panoramic image 774 is viewed by the left eye, and the right panoramic image 776 is viewed by the right eye, a stereoscopic, panoramic (e.g., up to 360 degree) view of the objects 762 can be re-created.

Figure 8:
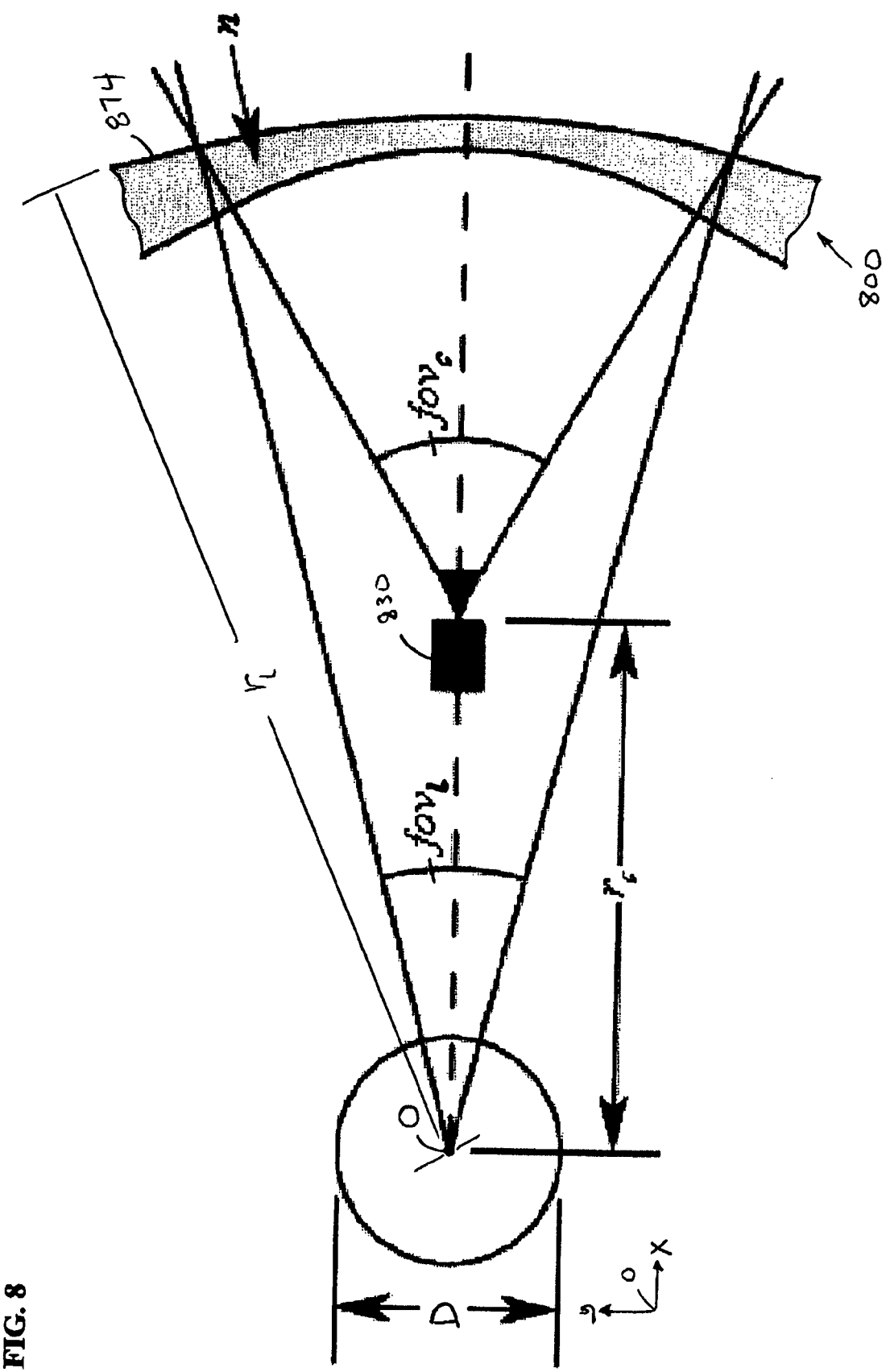
FIG. 8 illustrates several fields of view relating to a lens according to various embodiments.

FIG. 8 illustrates several fields of view relating to a lens 800 according to various embodiments. Lens 800 may be similar to or identical to the lens 400 shown in FIG. 4. A faceted lens 800 that performs the refraction to achieve the desired stereoscopic effect can be described mathematically based on certain specified physical values. These values include the inter-ocular distance (D) that provides the desired stereoscopic effect, the index of refraction (n) of the material to be used to create the faceted lens, the distance from the center of eye point rotation to the image capture device ($r_c$), the effective horizontal field of view of the image capture device ($fov_c$), and the effective horizontal field of view of the apparatus's faceted lens section ($fov_l$). The distance D may be a selected inter-ocular distance, which can be any desired distance, but which is most useful when selected to be approximately 4 centimeters to approximately 8 centimeters.

The subsequent mathematical process assumes an x-y coordinate system, having an origin O at the center of eye point rotation. All angular measurements are in degrees. The radius ($r_l$) of the external faceted lens surface 874 corresponds to the distance at which the field of view of the image capture device ($fov_c$) overlaps the field of view of the faceted lens section ($fov_l$), and can be calculated as follows:

$$r_l = \frac{r_c * \tan\left(\frac{fov_c}{2}\right)}{\cos\left(\frac{fov_l}{2}\right) * \tan\left(\frac{fov_c}{2}\right) - \sin\left(\frac{fov_l}{2}\right)}$$

Once the radius of the lens 800 has been determined, individual facet properties can be calculated. These facet properties can be calculated on a ray-by-ray basis, allowing for the design of a lens with any number of facets. For the purpose of this document, it may be assumed that an optimal image is attained using a single facet for each vertical pixel line acquired by the image capture device 830.

Figure 9:
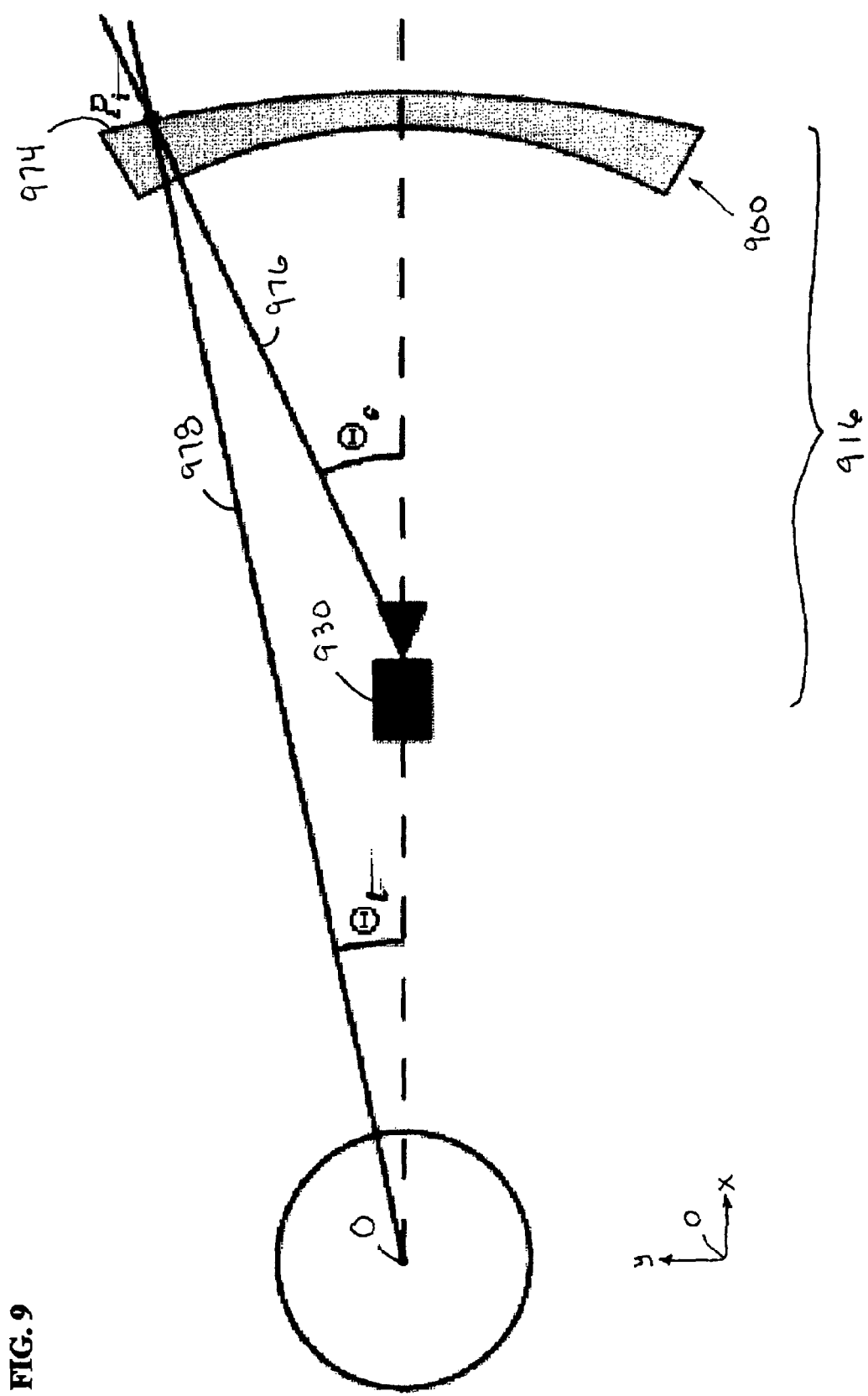
FIG. 9 is a top view of lens surface point ray angles relating to a lens according to various embodiments.

FIG. 9 is a top view of lens surface point ray angles relating to a lens 900 according to various embodiments. Lens 900 may be similar to or identical to the lens 400 shown in FIG. 4. The lens facet properties corresponding to a particular point on the lens surface 974 are dependent on the location of that point ($P_i$) and the angle of the ray 976 from the image capture device 930 to that point ($\Theta_c$). The apparatus 916 (which may be similar to or identical to the apparatus 416 shown in FIG. 4) can be designed such that the lens surface area corresponding to the field of view of the image capture device ($fov_c$) matches the lens surface area corresponding to the field of view of the faceted lens section ($fov_l$) (see FIG. 8). As a result, a ray 978 from the center of eye point rotation O may intersect the lens surface at the same point ($P_i$). The angle ($\Theta_l$) of that ray 978 can be calculated as follows:

$$\Theta_l = \frac{fov_l * \Theta_c}{fov_c}$$

This ray angle ($\Theta_l$) allows calculation of the lens surface intersection point ($P_i = P_{ix}$, $P_{iy}$ in x-y coordinates) as follows:

$$P_i = (P_{ix}, P_{iy})$$

$$P_{ix} = r_l * \cos(\Theta_l)$$

$$P_{iy} = r_l * \sin(\Theta_l)$$

Figure 10:
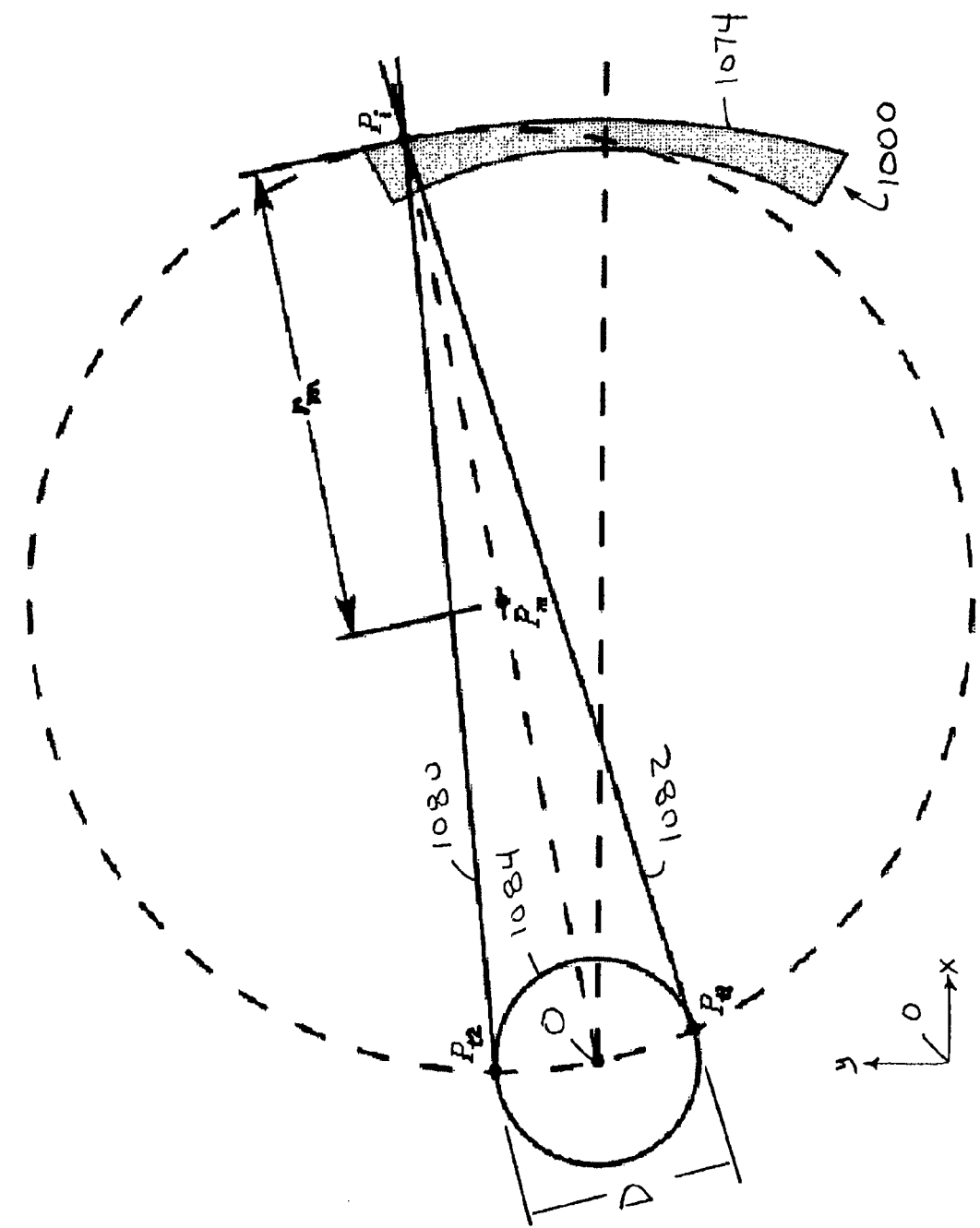
FIG. 10 is a top view of eye ray angles relating to a lens according to various embodiments.

FIG. 10 is a top view of eye ray angles relating to a lens 1000 according to various embodiments. Lens 1000 may be similar to or identical to lens 400 shown in FIG. 4. The lens facet residing at the lens surface intersection point ($P_i$) should preferably be oriented to capture either one of the desired left eye rays 1080 or right eye rays 1082, tangential to the circular path of eye rotation 1084 (having a diameter approximately equal to the inter-ocular distance D) and passing through the lens surface intersection point ($P_i$). By designating point $P_m$ as the midpoint between the lens surface intersection point $P_i$ and the center of rotation O, and radius $r_m$ as the radius of the circle defined by a diameter substantially equal to the distance from the center of rotation and the point $P_i$, the points of tangency ($P_{t1}$ and $P_{t2}$) can be calculated via the following process:

$$P_m = (P_{mx}, P_{my}) = \left(\frac{P_{ix}}{2}, \frac{P_{iy}}{2}\right)$$

$$r_m = \sqrt{(P_{mx} - P_{ix})^2 + (P_{my} - P_{iy})^2}$$

$$d = \sqrt{P_{mx}^2 + P_{my}^2}$$

$$P_{t1} = (P_{t1x}, P_{t1y})$$

$$P_{t1x} = \left(\frac{P_{mx}}{2}\right) + \left(\frac{P_{mx} * \left(\left(\frac{D}{2}\right)^2 - r_m^2\right)}{2d^2}\right) +$$

$$\left(\frac{P_{my}}{2d^2}\right) * \sqrt{\left(\left(\frac{D}{2} + r_m\right)^2 - d^2\right) * \left(d^2 - \left(r_m - \frac{D}{2}\right)^2\right)}$$

$$P_{t1y} = \left(\frac{P_{my}}{2}\right) + \left(\frac{P_{my} * \left(\left(\frac{D}{2}\right)^2 - r_m^2\right)}{2d^2}\right) -$$

$$\left(\frac{P_{mx}}{2d^2}\right) * \sqrt{\left(\left(\frac{D}{2} + r_m\right)^2 - d^2\right) * \left(d^2 - \left(r_m - \frac{D}{2}\right)^2\right)}$$

$$P_{t2} = (P_{t2x}, P_{t2y})$$

$$P_{t2x} = \left(\frac{P_{mx}}{2}\right) + \left(\frac{P_{mx} * \left(\left(\frac{D}{2}\right)^2 - r_m^2\right)}{2d^2}\right) -$$

$$\left(\frac{P_{my}}{2d^2}\right) * \sqrt{\left(\left(\frac{D}{2} + r_m\right)^2 - d^2\right) * \left(d^2 - \left(r_m - \frac{D}{2}\right)^2\right)}$$

$$P_{t2y} = \left(\frac{P_{my}}{2}\right) + \left(\frac{P_{my} * \left(\left(\frac{D}{2}\right)^2 - r_m^2\right)}{2d^2}\right) +$$

$$\left(\frac{P_{mx}}{2d^2}\right) * \sqrt{\left(\left(\frac{D}{2} + r_m\right)^2 - d^2\right) * \left(d^2 - \left(r_m - \frac{D}{2}\right)^2\right)}$$

Figure 11:
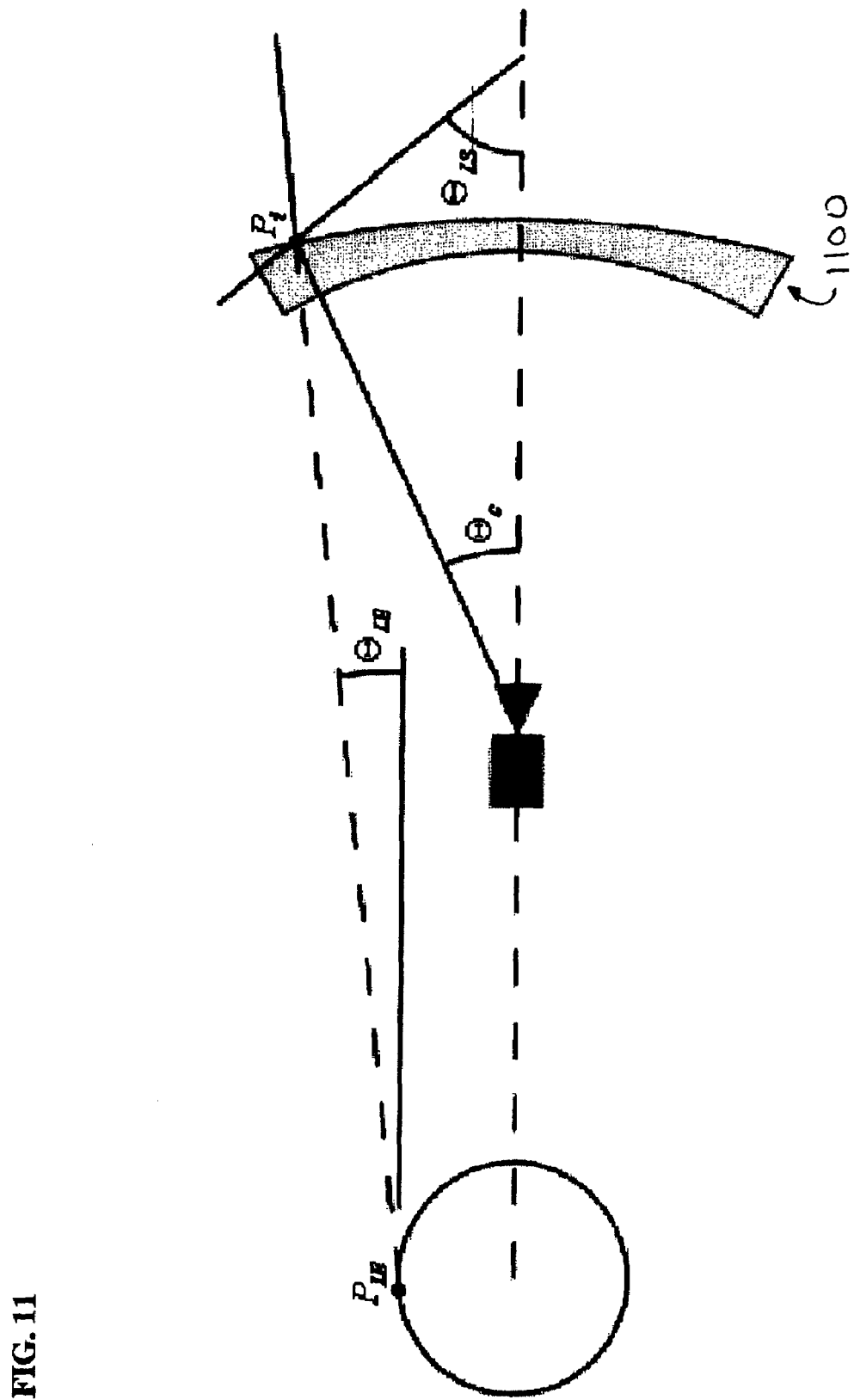
FIG. 11 is a top view of lens facet orientation angles relating to a lens according to various embodiments.

FIG. 11 is a top view of lens facet orientation angles relating to a lens 1100 according to various embodiments.

Figure 12:
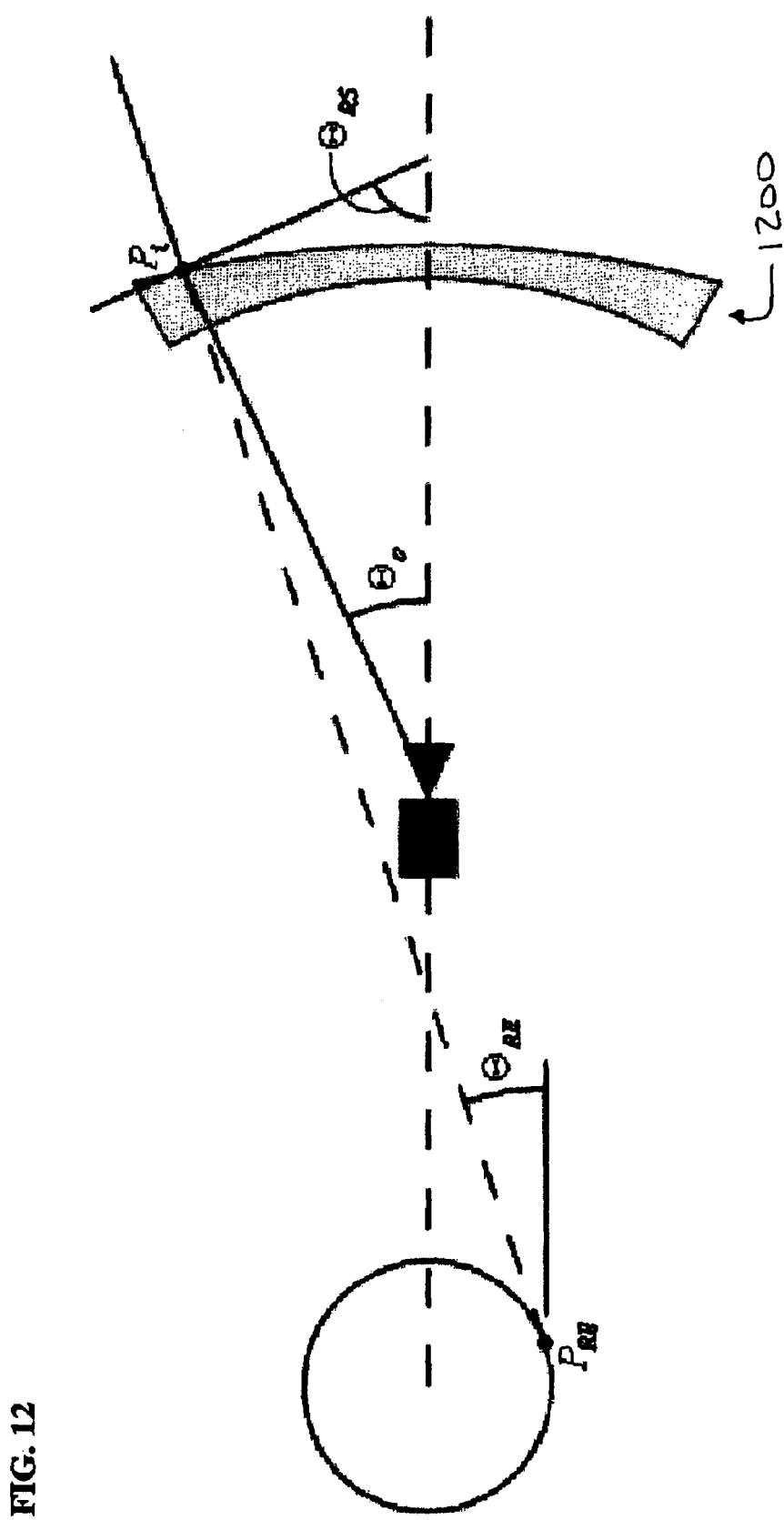
FIG. 12 is a top view of additional lens facet orientation angles relating to a lens according to various embodiments.

FIG. 12 is a top view of additional lens facet orientation angles relating to a lens 1200 according to various embodiments. Lenses 1100, 1200 may be similar to or identical to the lens 400 shown in FIG. 4. Referring now to FIGS. 10, 11, and 12, it can be seen that the two calculated points of tangency ($P_{t1}$ and $P_{t2}$), when viewed in conjunction with the lens surface intersection point ($P_i$), may correspond to the desired left eye ray ($P_{LE}$) and right eye ray ($P_{RE}$) that pass through the lens surface at that point.

$$P_{RE}=(P_{REx},P_{REy})=P_{t1}$$

$$P_{LE}=(P_{LEx},P_{LEy})=P_{t2}$$

The angle formed between each eye ray and the x-axis ($\Theta_{RE}$ and $\Theta_{LE}$, respectively) is useful in calculating the refraction properties of the current lens surface facet for each eye ray. These angles can be calculated as follows:

$$\Theta_{RE} = \arctan\left(\frac{P_{REy} - P_{iy}}{P_{REx} - P_{ix}}\right)$$

$$\Theta_{LE} = \arctan\left(\frac{P_{LEy} - P_{iy}}{P_{LEx} - P_{ix}}\right)$$

Once the eye ray angles ($\Theta_{RE}$ and $\Theta_{LE}$) have been calculated, the final facet properties may be calculated for the current lens position, taking into account the index of refraction n. The current facet may be chosen to perform refraction that will capture either the left eye ray ($\Theta_{LE}$) or the right eye ray ($\Theta_{RE}$). In order to perform the desired refraction, the lens facet must be oriented such that the incoming eye ray ($\Theta_{RE}$ or $\Theta_{LE}$) is refracted to match the current camera ray ($\Theta_c$). The lens facet orientation ($\Theta_{RS}$ or $\Theta_{LS}$) can be calculated as follows:

$$\Delta\Theta_R = \Theta_c - \Theta_{RE}$$

$$\Theta_{RS} = 90° - \Theta_c - \arctan\left(\frac{\sin(\Delta\Theta_R)}{n - \cos(\Delta\Theta_R)}\right)$$

$$\Delta\Theta_L = \Theta_c - \Theta_{LE}$$

$$\Theta_{LS} = 90° - \Theta_c - \arctan\left(\frac{\sin(\Delta\Theta_L)}{n - \cos(\Delta\Theta_L)}\right)$$

The entire process can be repeated on a facet-by-facet basis until the entire lens surface 1074 has been traversed.

Thus, in some embodiments, a lens 400, 500, 600, 700, 800, 900, 1000, 1100, 1200 may include an outer radius $r_l$ having a separating facet, such that $r_l$ is approximately equal to $$\frac{r_c * \tan\left(\frac{fov_c}{2}\right)}{\cos\left(\frac{fov_l}{2}\right) * \tan\left(\frac{fov_c}{2}\right) - \sin\left(\frac{fov_l}{2}\right)},$$

wherein $r_c$ comprises a distance from a center of rotation to an image acquisition plane, $fov_c$ comprises an effective horizontal field of view for the image acquisition plane, and $fov_l$ comprises an effective horizontal field of view spanned by the lens (see especially FIG. 8).

In some embodiments, a lens 400, 500, 600, 700, 800, 900, 1000, 1100, 1200 may include one or more separating facets having a facet orientation selected from one of $\Theta_{RS}$ approximately equal to $$90° - \Theta_c - \arctan\left(\frac{\sin(\Delta\Theta_R)}{n - \cos(\Delta\Theta_R)}\right),$$

wherein $\Delta\Theta_R$ is approximately equal to an image capture device ray angle minus a selected eye ray angle, and $\Theta_{LS}$ approximately equal to $$90° - \Theta_c - \arctan\left(\frac{\sin(\Delta\Theta_L)}{n - \cos(\Delta\Theta_L)}\right),$$

wherein $\Delta\Theta_L$ is approximately equal to an image capture device ray angle minus another selected eye ray angle. Further, it has been shown that any number of image acquisition planes may be located at a radial distance $r_c$ from an origin point located at a center of a selected inter-ocular distance (e.g., an inter-ocular distance of approximately 4 cm to 8 cm). It has also been shown that an outer radius of the lens $r_l$ may correspond to a distance at which a field of view of the associated image acquisition plane overlaps a field of view of the lens.

Many other embodiments may be realized. While the figures so far have shown lenses and devices using lenses that allow a single image capture device to capture imagery from two distinct, separate viewpoints (e.g., left eye and right eye), the disclosed embodiments are not to be so limited. In fact, the formulas shown can be used to construct lenses, image capture devices, and projectors that operate using three or more viewpoints.

Figure 13:
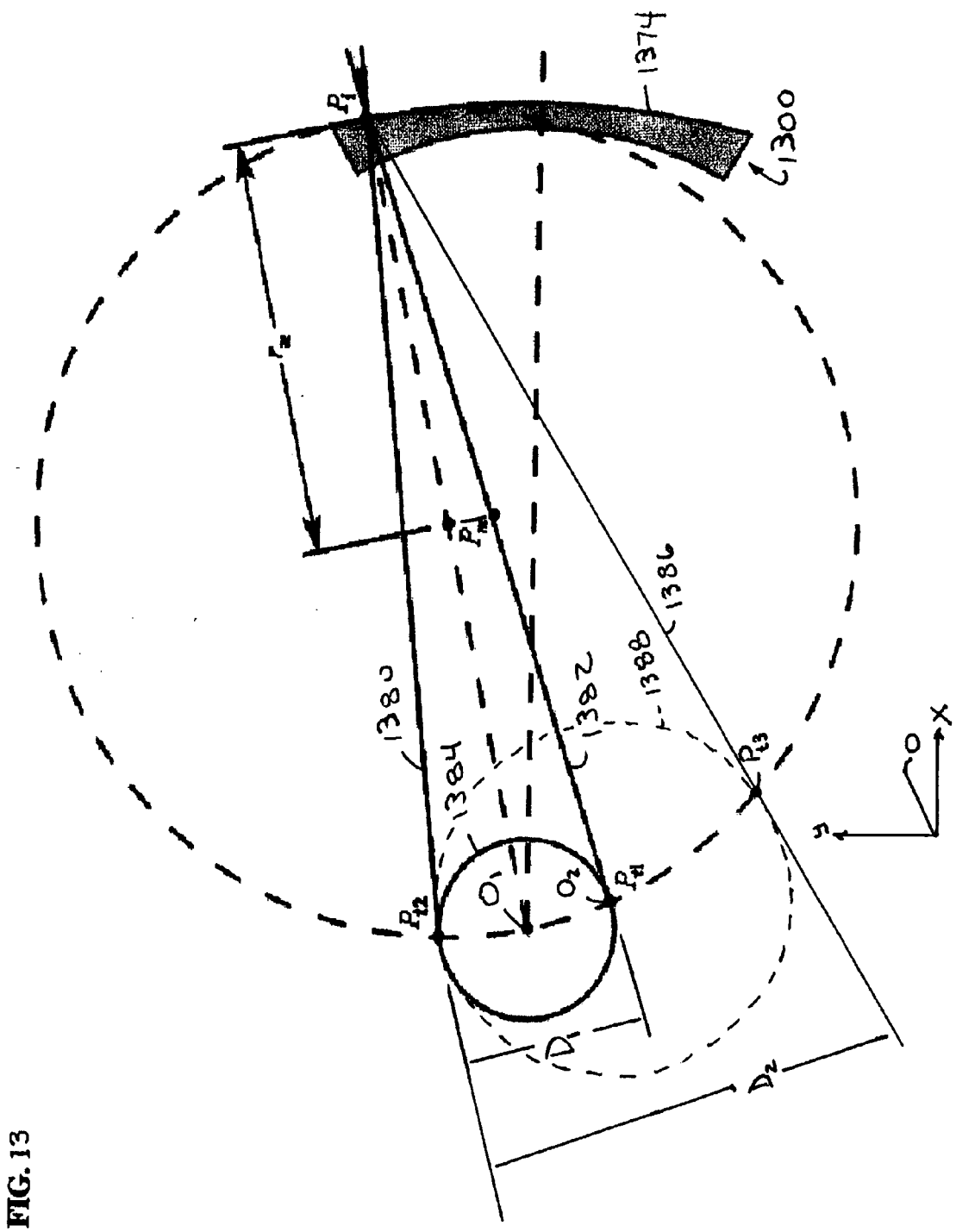
FIG. 13 is a top view of a multi-viewpoint lens according to various embodiments.

For example, FIG. 13 is a top view of a multi-viewpoint lens 1300 according to various embodiments. The lens 1300 may be similar to or identical to lens 400 shown in FIG. 4. The lens facet residing at the lens surface intersection point ($P_i$) should preferably be oriented to capture one of the desired left eye rays 1380, one of the right eye rays 1382, and/or an additional eye ray 1386 (e.g., a third viewpoint) tangential to a first circular path of eye rotation 1384 (having a diameter approximately equal to the inter-ocular distance $D_1$) or to a second circular path of eye rotation 1388 (having a diameter approximately equal to the inter-ocular distance $D_2$) and passing through the lens surface intersection point ($P_i$). Thus, any number of additional viewpoints may be accommodated by altering the inter-ocular distance (e.g., selecting $D_2$ instead of $D_1$), forming a new circular path of eye rotation (e.g., having a center of rotation at $O_2$ instead of $O_1$), and finding a new point of tangency (e.g., $P_{t3}$ instead of $P_{t1}$) on the circular path.

By designating point $P_m$ as the midpoint between the lens surface intersection point $P_i$ and the center of rotation $O_1$ (or $O_2$), and radius rm as the radius of the circle defined by a diameter substantially equal to the distance from the center of rotation and the point $P_i$, the points of tangency ($P_{t1}$, $P_{t2}$, or $P_{t3}$, $P_{t2}$) can be calculated by the same process as shown for FIG. 10. Facets for each of the viewpoints $P_{t1}$, $P_{t2}$, and $P_{t3}$ can be formed in the surface 1374 of the lens as described with respect to FIGS. 1-3 and 10-12, perhaps in an interleaved fashion.

Thus, many variations of the lens 1300 may be realized. For example, the lens 1300 may include a plurality of separating facets, such as left eye separating facets, right eye separating facets, and one or more additional eye ray separating facets (perhaps corresponding to multiple additional viewpoints).

An example of using the formulas shown above for such a multi-faceted lens include a lens 1300 having a first separating facet with a facet orientation of $\Theta_{RS}$ $$\left(\text{approximately equal to } 90° - \Theta_c - \arctan\left(\frac{\sin(\Delta\Theta_R)}{n - \cos(\Delta\Theta_R)}\right)\right),$$

where $\Delta\Theta_R$ is approximately equal to the image capture device ray angle minus a selected first eye ray angle, a second separating facet with a facet orientation of $\Theta_{LS}$ $$\left(\text{approximately equal to } 90° - \Theta_c - \arctan\left(\frac{\sin(\Delta\Theta_L)}{n - \cos(\Delta\Theta_L)}\right)\right),$$

where $\Delta\Theta_L$ is approximately equal to the image capture device ray angle minus a second selected eye ray angle, and a third separating facet having a facet orientation of $\Theta_{TS}$ $$\left(\text{approximately equal to } 90° - \Theta_c - \arctan\left(\frac{\sin(\Delta\Theta_T)}{n - \cos(\Delta\Theta_T)}\right)\right),$$

where $\Delta\Theta_T$ is approximately equal to the image capture device ray angle minus a third selected eye ray angle.

Figure 14:
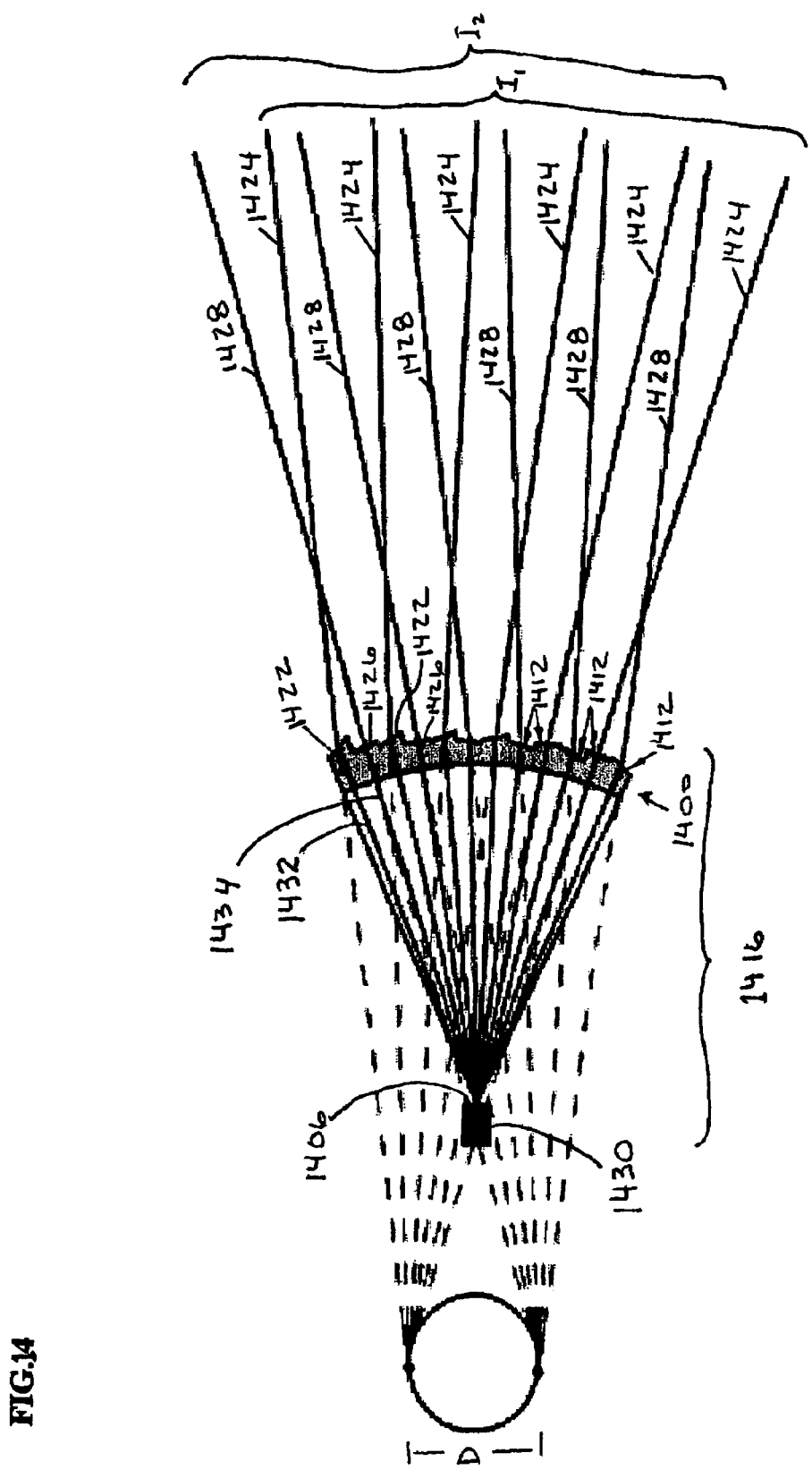
FIG. 14 is a top view of a multi-viewpoint image capture apparatus according to various embodiments.

The lens 1300 may form a portion of a multi-viewpoint image capture device, or a multi-image projection system. Thus, other embodiments may be realized. For example, FIG. 14 is a top view of a multi-viewpoint image capture apparatus 1416 according to various embodiments. Thus, a lens 1400 can be provided that enables a single device to capture two or more distinct images simultaneously. For example, a single image capture device, equipped with a lens similar to that described in FIGS. 4, 10, or 13, can be placed in a room to capture a first image near a first wall, a second near another wall, and a third in between the first and second walls.

Such an image capture device is shown in FIG. 14. In this illustration, the apparatus 1416, which may be similar to the apparatus 416, is shown along with the relevant inter-ocular distance D. The apparatus 1416 may include a lens 1400 having a plurality of interleaved separating facets 1412 including a first separating facet 1422 to refract left eye rays 1424 and a second separating facet 1426 to refract right eye rays 1428. Thus, the left eye rays may be grouped as rays received from a first image, and the right eye rays may be grouped as rays received from a second image. The apparatus 1416 may also include an image acquisition plane 1406 (perhaps as part of an image capture device 1430, such as a frame-grabber, digital video camera, or some other device) to receive a refracted left eye ray 1432 from the first separating facet 1422, and to receive a refracted right eye ray 1434 from the second separating facet 1426. Additional separating facets (not shown for purposes of clarity) can be included in the lens 1400, as described with respect to the lens 1300 in FIG. 13, and additional eye rays associated with other viewpoints (e.g., the third viewpoint associated with the point of tangency $P_{t3}$ in FIG. 13) may be acquired at the image acquisition plane 1406 according to the location of the various facets on the lens 1400, and the pixels on the plane 1406.

Thus, many variations of the apparatus 1416 may be realized. For example, the apparatus 1416 may include a lens having a first plurality of interleaved separating facets including a first separating facet to refract left eye rays and a second separating facet to refract right eye rays, and an image acquisition plane to receive a first refracted left eye ray from the first separating facet, and to receive a first refracted right eye ray from the second separating facet.

The lens may include one or more additional eye ray separating facets interleaved with the first separating facet and the second separating facet. In this case, the first separating facet may correspond to a first viewpoint, the second separating facet may correspond to a second viewpoint, and one of the additional eye ray separating facets may correspond to a third viewpoint.

As noted previously, the image acquisition plane may be located at a radial distance $r_c$ from a first origin point located at the center of a first inter-ocular distance. Additional separating facets included in the lens may correspond to a second inter-ocular distance and be interleaved with the first and second separating facets. Thus, the image acquisition plane may be used to receive additional refracted eye rays from the additional separating facets.

Figure 15:
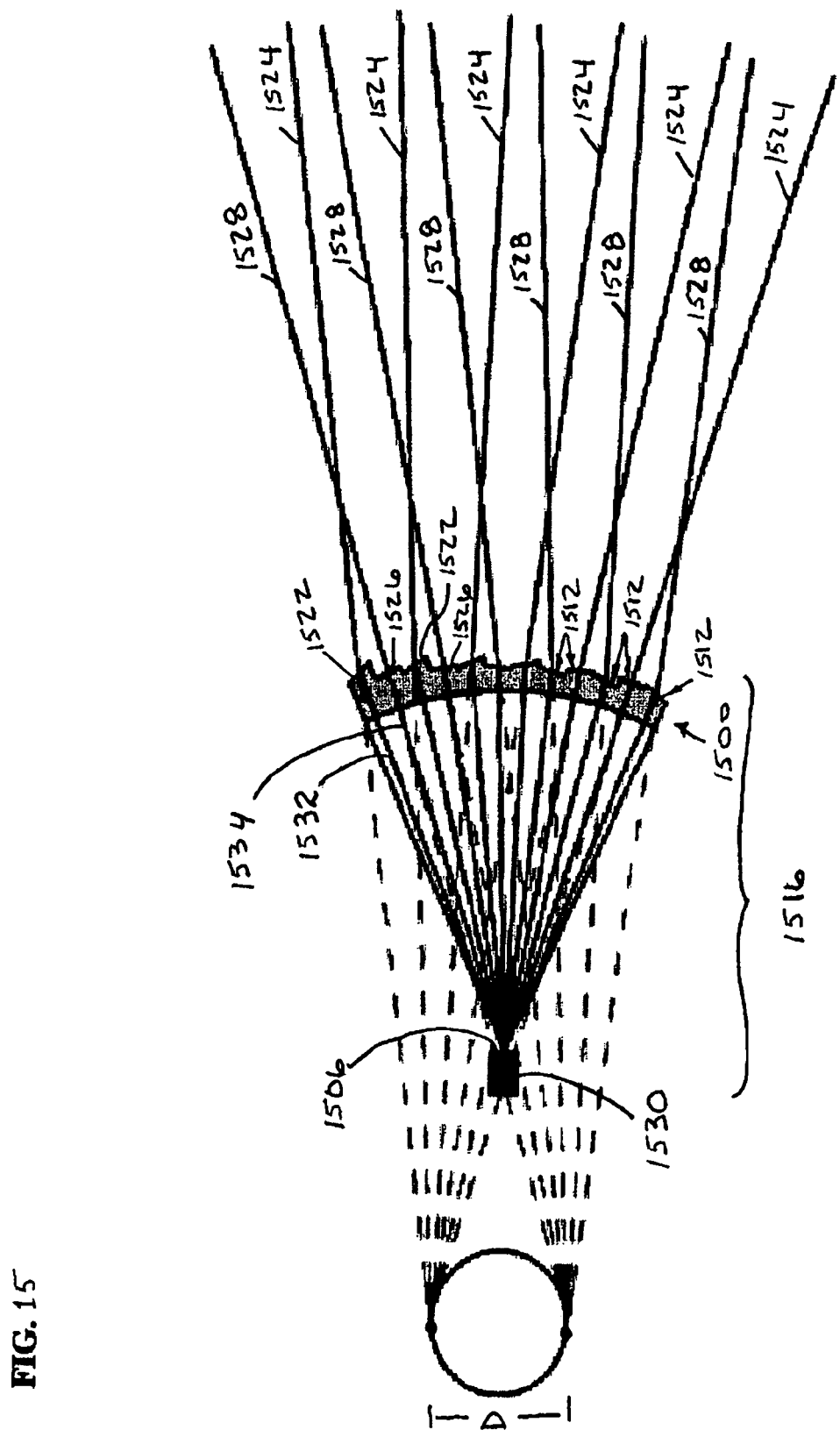
FIG. 15 is a top view of a multiple-image projection system according to various embodiments.

Yet other embodiments may be realized. For example, FIG. 15 is a top view of a multiple-image projection system 1516 according to various embodiments. Much of the prior discussion has focused on the use of lenses and image capture devices capable of capturing imagery from two or more viewpoints (e.g., $P_{t1}$, $P_{t2}$, and $P_{t3}$ in FIG. 13, and FIG. 14). This concept can be reversed and applied to the projection of images. Thus, a lens can be provided that enables a single projector to display two or more distinct video presentations simultaneously. For example, a single projector, equipped with a lens similar to that described in FIGS. 4, 10, 13, or 14 could be pointed at the corner of a room and display a first video scene on one wall, a second on another wall, and a third on a wall adjacent the first and second walls. Of course, this assumes the video presentations would be interlaced prior to projection according to the interlacing technique chosen for the projector lens (e.g., horizontal or vertical interlacing of facets).

Such a projector is shown in FIG. 15. In this illustration, apparatus 1516 may include a lens 1500 having a plurality of interleaved separating facets 1512 including a first separating facet 1522 to refract left eye rays 1524 and a second separating facet 1526 to refract right eye rays 1528. Thus, the left eye rays may be grouped to form a first projected image $I_1$, and the right eye rays may be grouped to form a second projected image $I_2$.

The apparatus 1516 may also include an image projection plane 1506 (perhaps as part of an image projection device 1530, such as a digital video projector, or some similar device) to transmit a refracted left eye ray 1532 to the first separating facet 1522, and to transmit a refracted right eye ray 1534 to the second separating facet 1526. Additional separating facets (not shown for purposes of clarity) can be included in the lens 1500, as described with respect to the lens 1300 in FIG. 13, and additional eye rays associated with a third viewpoint (e.g., $P_{t3}$ in FIG. 13).

The image projection plane 1506 may be located at a radial distance $r_c$ from an origin point located at a center of a first inter-ocular distance (e.g., $D_1$ in FIG. 13), which may comprise a distance of approximately 4 centimeters to approximately 8 centimeters. The lens 1500 may include one or more additional eye ray separating facets (not shown for clarity, but perhaps interleaved with the first separating facet 1522 and the second separating facet 1526), wherein the first separating facet corresponds to a first viewpoint, wherein the second separating facet corresponds to a second viewpoint, and wherein the additional eye ray separating facet corresponds to a third viewpoint and a second inter-ocular distance (e.g., $D_2$ in FIG. 13).

The faceted lens 100, 200, 300, 400, 500, 538, 542, 600, 700, 800, 900, 1000, 1100, 1200, 1300, 1400, 1500; refracting right eye rays 102, 202; outer surface 104, 204, 304; image acquisition planes 106, 206, 306, 406, 540, 544, 1406; video camera 110, 210, 310; lens facets 112, 212, 312, 412, 512, 1412, 1512; eye rays 114, 214; apparatus 316, 416, 516, 716, 1416, 1516; first separating facet 422, 1422, 1522; left eye rays 424, 1424, 1524; second separating facet 426, 1426, 1526; right eye rays 428, 1428, 1528; image capture device 430, 530, 730, 830, 930, 1430; refracted left eye ray 432, 1432, 1532; refracted right eye ray 434, 1434, 1534; system 536, 636; inner radii 546, 552; portion 548; cylindrical section 550; cylinder 554; memory 556; image data 558; processor 560; objects 762; interlaced image 764; left and right eye image strips 766, 768; left and right image sections 770, 772; left and right eye panoramic images 774, 776; lens surface 974, 1074, 1374; rays 976, 978, 1080, 1082, 1380, 1382, 1386; circular paths of eye rotation 1084, 1384, 1388; additional eye ray 1386; image projection plane 1506; and image projection device 1530 may all be characterized as "modules" herein. Such modules may include hardware circuitry, and/or one or more processors and/or memory circuits, software program modules, including objects and collections of objects, and/or firmware, and combinations thereof, as desired by the architect of the lens 100, 200, 300, 400, 500, 538, 542, 600, 700, 800, 900, 1000, 1100, 1200, 1300, 1400, 1500, apparatus 316, 416, 516, 716, 1416, 1516 and systems 536, 636, and as appropriate for particular implementations of various embodiments.

It should also be understood that the lens, apparatus, and systems of various embodiments can be used in applications other than panoramic cameras, and thus, various embodiments are not to be so limited. The illustrations of the lens 100, 200, 300, 400, 500, 538, 542, 600, 700, 800, 900, 1000, 1100, 1200, 1300, 1400, 1500, apparatus 316, 416, 516, 716, 1416, 1516 and system 536, 636 are intended to provide a general understanding of the structure of various embodiments, and they are not intended to serve as a complete description of all the elements and features of apparatus and systems that might make use of the structures described herein.

Applications that may include the novel lens, apparatus, and systems of various embodiments include frame grabbers, cameras, binoculars, telescopes, and microscopes. Such lenses, apparatus, and systems may further be included as sub-components within a variety of electronic systems, such as televisions, cellular telephones, personal computers, personal digital assistants (PDAs), workstations, video players, video games, vehicles, and others.

Figure 16B:
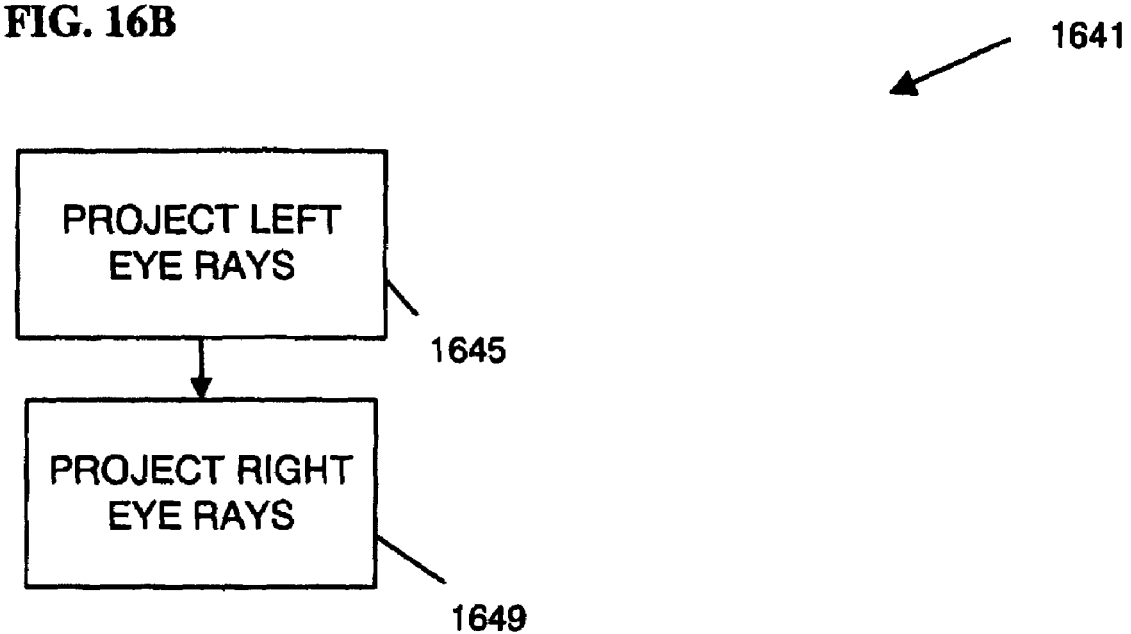

Still further embodiments may be realized. For example, FIGS. 16A and 16B are flow charts illustrating several methods according to various embodiments. Some of the methods to be described may be derived from the process illustrated in FIG. 7. Thus, in some embodiments of the invention, a method 1611 may (optionally) begin at block 1615 with receiving a plurality of left eye rays through one of a first plurality of separating facets of a lens at an image acquisition plane, and receiving a plurality of right eye rays through one of a second plurality of separating facets of the lens at the image acquisition plane. The first plurality of separating facets may be interleaved with the second plurality of separating facets, as shown in FIG. 4.

The method 1611 may continue with acquiring data from the image acquisition plane to construct a separated left eye image, and acquiring data from the image acquisition plane to construct a separated right eye image at block 1619. The method 1611 may further include joining the separated left eye image to provide a joined left eye image, and joining the separated right eye image to provide a joined right eye image at block 1627, as well as combining the joined left eye image and the joined right eye image to provide a stereoscopic image at block 1627. The method may also include combining the joined left eye image and the joined right eye image to provide a 360 degree (or some lesser amount of degrees), panoramic stereoscopic image at block 1631. As noted previously, an outer radius of the lens may correspond to a distance at which a field of view of the image acquisition plane overlaps a field of view of the lens.

The method 1611 may also include repeatedly acquiring data from the image acquisition plane to construct a separated left eye image, repeatedly acquiring data from the image acquisition plane to construct a separated right eye image, and processing the separated left eye image and the separated right eye image to provide a moving stereoscopic image at block 1623. The method 1611 may further include repeatedly acquiring data from the image acquisition plane to construct a separated left eye image, repeatedly acquiring data from the image acquisition plane to construct a separated right eye image, and processing the separated left eye image and the separated right eye image to provide a moving 360 degree (or some lesser number of degrees), panoramic stereoscopic image at block 1623.

Still further embodiments may be realized. For example, a method of projecting multiple images is illustrated in FIG. 16B. Thus, a method 1641 may include projecting a plurality of left eye rays through one of a first plurality of separating facets of a lens from an image projection plane at block 1645. The method 1641 may also include projecting a plurality of right eye rays through one of a second plurality of separating facets of the lens from the image projection plane at block 1649. The first plurality of separating facets may be interleaved with the second plurality of separating facets, and the plurality of left eye rays may comprise a portion of a separated left eye image, while the plurality of right eye rays may comprise a portion of a separated right eye image. As described previously with respect to an image capture plane, the outer radius of the lens may correspond to a distance at which the field of view of the image projection plane overlaps the field of view of the lens.

It should be noted that the methods described herein do not have to be executed in the order described, or in any particular order. Moreover, various activities described with respect to the methods identified herein can be executed in repetitive, iterative, serial, or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized.

Figure 17:
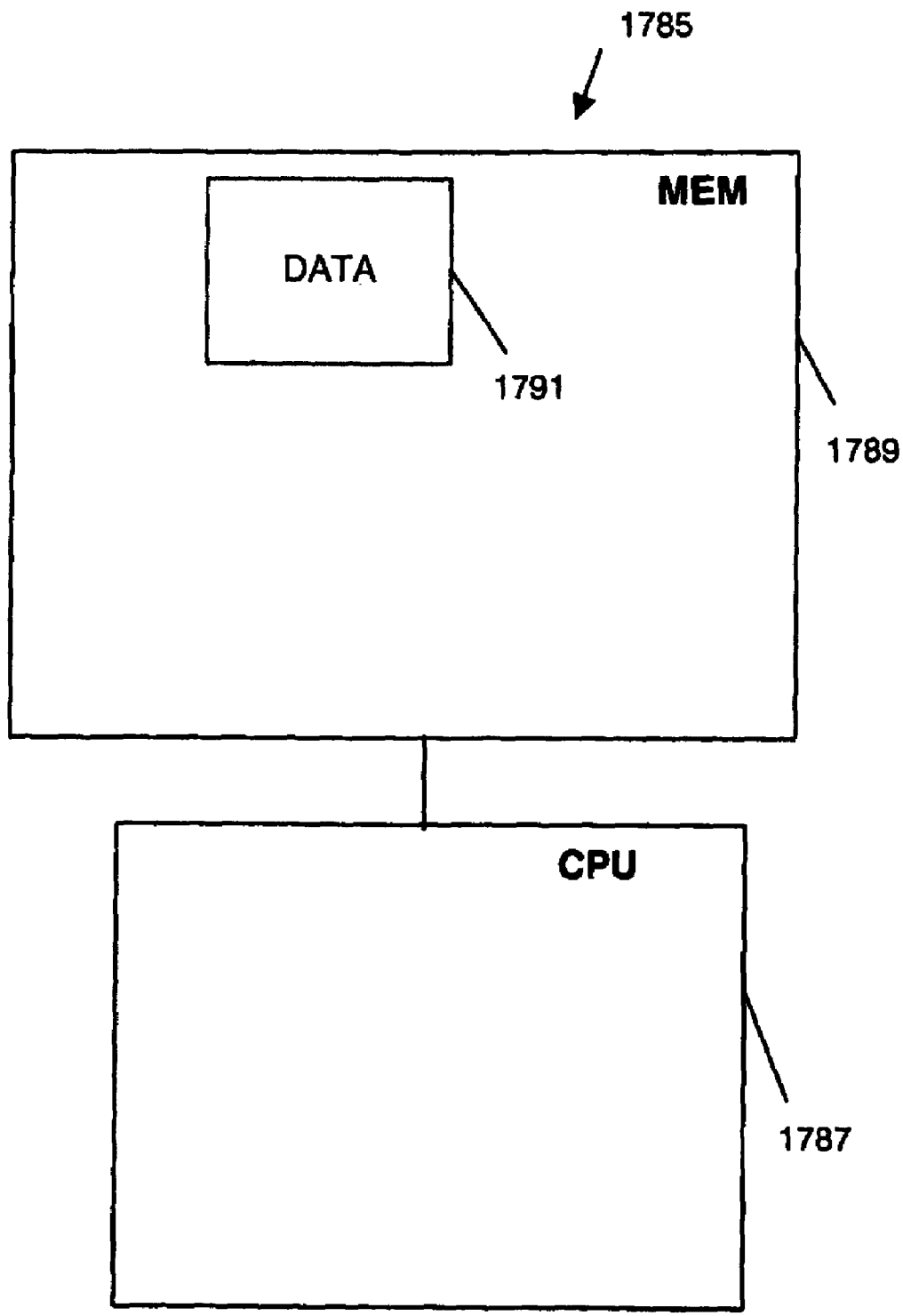
FIG. 17 is a block diagram of several articles according to various embodiments.

FIG. 17 is a block diagram of an article 1785 according to various embodiments, such as a computer, a memory system, a magnetic or optical disk, some other storage device, and/or any type of electronic device or system. The article 1785 may comprise a processor 1787 coupled to a machine-accessible medium such as a memory 1789 (e.g., a memory including an electrical, optical, or electromagnetic conductor) having associated information 1791 (e.g., computer program instructions or other data), which when accessed, results in a machine (e.g., the processor 1787) performing such actions as receiving a plurality of left eye rays through one of a first plurality of separating facets of a lens at an image acquisition plane, and receiving a plurality of right eye rays through one of a second plurality of separating facets of the lens at the image acquisition plane.

Other actions may include acquiring data from the image acquisition plane to construct a separated left eye image, and acquiring data from the image acquisition plane to construct a separated right eye image. Further activity may include joining the separated left eye image to provide a joined left eye image, and joining the separated right eye image to provide a joined right eye image, as well as combining the joined left eye image and the joined right eye image to provide a stereoscopic image.

Still further activities may include projecting a plurality of left eye rays through one of a first plurality of separating facets of a lens from an image projection plane, and projecting a plurality of right eye rays through one of a second plurality of separating facets of the lens from the image projection plane. As noted previously, the plurality of left eye rays may comprise a portion of a separated left eye image, and the plurality of right eye rays may comprise a portion of a separated right eye image.

Implementing the lenses, apparatus, systems, and methods described herein may provide a mechanism for re-creating panoramic (up to 360 degrees), stereoscopic images in real time. In many cases, a single lens may be used in place of multiple lenses. Such a mechanism may improve the quality of imaging in three dimensions at reduced cost and increased efficiency.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
receiving a plurality of left eye rays through one of a first plurality of separating facets of a lens at an image acquisition plane; and
receiving a plurality of right eye rays through one of a second plurality of separating facets of the lens at the image acquisition plane, wherein the plurality of left eye rays and the plurality of right eye rays received by all separating facets of the lens and passing through a lens surface intersection point are tangential to a circular path of eye rotation.

2. The method of claim 1, wherein the first plurality of separating facets are interleaved with the second plurality of separating facets.

3. The method of claim 1, further comprising:
acquiring data from the image acquisition plane to construct a separated eye image.

4. The method of claim 3, wherein the separated eye image is selected from at least one of a separated left eye image and a separated right eye image.

5. The method of claim 3, further comprising:
joining the separated eye image to provide a joined eye image.

6. The method of claim 5, wherein the joined eye image is selected from at least one of a joined right eye image and a joined left eye image.

7. The method of claim 6, further comprising:
combining the joined left eye image and the joined right eye image to provide a stereoscopic image.

8. The method of claim 6, further comprising:
combining the joined left eye image and the joined right eye image to provide a panoramic stereoscopic image.

9. The method of claim 1, wherein an outer radius of the lens corresponds to a distance at which a field of view of the first image acquisition plane overlaps a field of view of the lens.

10. The method of claim 1, further comprising:
repeatedly acquiring data from the image acquisition plane to construct a separated left eye image;
repeatedly acquiring data from the image acquisition plane to construct a separated right eye image; and
processing the separated left eye image and the separated right eye image to provide a moving stereoscopic image.

11. The method of claim 1, further comprising:
repeatedly acquiring data from the image acquisition plane to construct a separated left eye image;
repeatedly acquiring data from the image acquisition plane to construct a separated right eye image; and
processing the separated left eye image and the separated right eye image to provide a moving panoramic stereoscopic image.

12. A method, comprising:
capturing a plurality of left eye rays and a plurality of right eye rays at each one of a corresponding plurality of separating facets included in a lens; and
constructing an interlaced image from the plurality of captured left eye rays and the plurality of captured right eye rays, wherein the plurality of left eye rays and the plurality of right eye rays captured by the corresponding plurality of separating facets and passing though a surface of the lens are tangential to a circular path of eye rotation.

13. The method of claim 12, further comprising:
constructing a de-interlaced eye image strip from the interlaced image.

14. The method of claim 13, wherein the de-interlaced eye image strip is selected from at least one of a left de-interlaced eye image strip and a right de-interlaced eye image strip.

15. The method of claim 13, further comprising:
constructing a separated eye image section from the de-interlaced eye image strip.

16. The method of claim 15, wherein the separated eye image section is selected from at least one of a left separated eye image section and a right separated eye image section.

17. An article comprising a machine-accessible medium having associated information, wherein the information, when accessed, results in a machine performing:
receiving a plurality of left eye rays though one of a first plurality of separating facets of a lens at an image acquisition plane; and
receiving a plurality of right eye rays though one of a second plurality of separating facets of the lens at the image acquisition plane, wherein the plurality of left eye rays and the plurality of right eye rays received by all separating facets of the lens and passing though a lens surface intersection point are tangential to a circular path of eye rotation.

18. The article of claim 17, wherein the information, when accessed, results in the machine performing:
acquiring data from the image acquisition plane to construct a separated eye image.

19. The article of claim 18, wherein the separated eye image is selected from at least one of a separated left eye image and a separated right eye image.

20. The article of claim 19, wherein the information, when accessed, results in the machine performing:
joining the separated left eye image to provide a joined left eye image; and
joining the separated right eye image to provide a joined right eye image.

21. The article of claim 20, wherein the information, when accessed, results in the machine performing:
combining the joined left eye image and the joined right eye image to provide a stereoscopic image.

22. An apparatus, comprising:
a first lens having a first plurality of interleaved separating facets including a first separating facet to refract left eye rays and a second separating facet to refract right eye rays, wherein the left eye rays and the right eye rays received by all separating facets of the lens and passing through a lens surface intersection point are tangential to a circular path of eye rotation; and
a first image acquisition plane to receive a first refracted left eye ray from the first separating facet, and to receive a first refracted right eye ray from the second separating facet.

23. The apparatus of claim 22, wherein the first lens includes at least one additional eye ray separating facet interleaved with the first separating facet and the second separating facet, wherein the first separating facet corresponds to a first viewpoint, wherein the second separating facet corresponds to a second viewpoint, and wherein the additional eye ray separating facet corresponds to a third viewpoint.

24. The apparatus of claim 22, further comprising:
a second lens having a second plurality of interleaved separating facets including a third separating facet to refract the left eye rays and a fourth separating facet to refract the right eye rays; and
a second image acquisition plane to receive a second refracted left eye ray from the third separating facet, and to receive a second refracted right eye ray from the fourth separating facet.

25. The apparatus of claim 24, wherein the first lens has a first inner radius defining a portion of a cylindrical section, and wherein the second lens has a second inner radius located approximately on a cylinder defined by the portion of the cylindrical section.

26. The apparatus of claim 24, wherein the first image acquisition plane and the second image acquisition plane are located at a radial distance $r_c$ from an origin point located at a center of a selected inter-ocular distance.

27. The apparatus of claim 26, wherein the selected inter-ocular distance is approximately 4 centimeters to approximately 8 centimeters.

28. The apparatus of claim 22, wherein the first image acquisition plane is located at a radial distance $r_c$ from a first origin point located at a center of a first inter-ocular distance, wherein the first lens includes an additional separating facet corresponding to a second inter-ocular distance and interleaved with the first separating facet and the second separating facet, and wherein the first image acquisition plane is to receive an additional refracted eye ray from the additional separating facet.

29. The apparatus of claim 22, wherein an outer radius of the first lens corresponds to a distance at which a field of view of the first image acquisition plane overlaps a field of view of one of the first plurality of interleaved separating facets.

30. A system, comprising:
a plurality of lenses having a plurality of interleaved separating facets including a first separating facet to refract left eye rays and a second separating facet to refract right eye rays, wherein the left eye rays and the right eye rays refracted by all separating facets of at least one of the plurality of lenses and passing through a lens surface intersection point are tangential to a circular path of eye rotation;
a plurality of image acquisition planes to receive refracted left eye rays from the first separating facets and to receive refracted right eye rays from the second separating facets; and
a memory to receive image data from the plurality of image acquisition planes.

31. The system of claim 30, wherein the image data includes information to construct a stereoscopic image.

32. The system of claim 30, wherein the image data includes information to construct a panoramic stereoscopic image.

33. The system of claim 30, wherein the image data includes a separated left eye image and a separated right eye image.

34. The system of claim 33, further comprising:
a processor coupled to the memory to join the separated left eye image and to join the separated right eye image.

* * * * *